(12) United States Patent
Achiwa et al.

(10) Patent No.: US 7,475,131 B2
(45) Date of Patent: Jan. 6, 2009

(54) NETWORK TOPOLOGY DISPLAY METHOD, MANAGEMENT SERVER, AND COMPUTER PROGRAM PRODUCT

(75) Inventors: Kyosuke Achiwa, Odawara (JP); Tomoki Shoji, Fujisawa (JP); Masafumi Nozawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 596 days.

(21) Appl. No.: 11/155,571

(22) Filed: Jun. 20, 2005

(65) Prior Publication Data

US 2006/0220533 A1    Oct. 5, 2006

(30) Foreign Application Priority Data

Apr. 1, 2005    (JP) .............................. 2005-106245

(51) Int. Cl.
G06F 15/173 (2006.01)
G06F 15/177 (2006.01)
G06F 3/00 (2006.01)
H04L 12/28 (2006.01)

(52) U.S. Cl. ....................... 709/223; 709/238; 715/734; 715/736; 715/738; 370/351

(58) Field of Classification Search ................ 709/223, 709/224
See application file for complete search history.

(56) References Cited

U.S. PATENT DOCUMENTS 7,127,445 B2 * 10/2006 Mogi et al. ................... 707/1
7,428,584 B2 * 9/2008 Yamamoto et al. .......... 709/223
2003/0233427 A1 * 12/2003 Taguchi ..................... 709/220
2005/0108375 A1 * 5/2005 Hallak-Stamler ........... 709/223
2005/0267986 A1 * 12/2005 Murakami et al. .......... 709/238
2006/0041559 A1 * 2/2006 Baldwin et al. ............. 707/10

FOREIGN PATENT DOCUMENTS

| JP | 2003-141054 | 5/2003 |
| JP | 2003-316671 | 11/2003 |
| JP | 2004-254270 | 9/2004 |

* cited by examiner

Primary Examiner—Jason D Cardone
Assistant Examiner—Xiang Yu
(74) Attorney, Agent, or Firm—Mattingly, Stanger, Malur & Brundidge, P.C.

(57) ABSTRACT

A method for displaying an access path between a virtual volume of a storage controller that has an external storage connecting function, and an external volume of an external storage system. By this method, port connection information about an access path defined between the virtual volume and the external volume is collected. A first network address for identifying an access port of the storage controller on the access path is collected. Also, a second network address for identifying an access port of the external storage system on the access path is collected. Moreover, identification information for identifying the external volume is collected. Finally, the network topology between the virtual volume and the external volume is displayed based on the port connection information, the first network address, the second network address, and the identification information.

12 Claims, 21 Drawing Sheets

EXAMPLE OF ACCESS PATH SEARCH FROM PORT A TO PORT I

EXAMPLE OF ACCESS PATH SEARCH FROM PORT J TO PORT L

EXTERNAL CONNECTION TOPOLOGY DISPLAY PROCESSING

NETWORK TOPOLOGY DISPLAY METHOD, MANAGEMENT SERVER, AND COMPUTER PROGRAM PRODUCT

CROSS-REFERENCE TO RELATED APPLICATION

This application relates to and claims priority from Japanese Patent Application No. 2005-106245, filed on Apr. 1, 2005, the entire disclosure of which is incorporated herein by reference.

BACKGROUND OF THE INVENTION

The present invention relates to a network topology display method, a management server, and a computer program product.

Governments, public offices, local public authorities, corporations, educational institutions, and other organizations manage data by using comparatively large-scale storage systems in order to deal with great amounts of various data. A storage system is composed of, for example, a disk array apparatus. The disk array apparatus is configured by allocating a large number of storage devices in arrays and provides, for example, storage areas based on RAID (Redundant Arrays of Independent/Inexpensive Disks). Lately, with the dissemination of the SAN (Storage Area Network) environment, integration of storage systems is accelerating rapidly. In the SAN environment, a plurality of storage systems is connected via high-speed FC (Fibre Channel) switches to a plurality of host computers, and an operation management function is required for the easy management of the SAN configuration, early detection of failures, and ensuring security via prompt response and appropriate access control. Japanese Patent Laid-Open (Kokai) Publication Nos. 2003-316671, 2003-141054, and 2004-254270 are known as examples of techniques for managing the network configuration of the SAN environment.

SUMMARY OF THE INVENTION

Conventional SAN management software is capable of graphically displaying: an access path from a host computer to a storage system by showing exactly which route is taken from an HBA (Host Bus Adapter) of the host computer, specifically speaking—which port of an FC switch is selected and which port of the storage system is selected; and a mapping relationship between a logical volume and a physical volume. However, it cannot display an access path, via an external connection port to an external volume, from a virtual volume of a storage system that has an external connecting function. This is because the access path on the back-end side relates to the internal structure of the storage system and, therefore, there has been little need to show the access path of the external connection to a manager.

Also, in the case where a host computer is connected via a virtualization switch to a storage system, conventional SAN management software cannot display an access path between a virtual volume in the virtualization switch and a volume in the storage system.

The present invention has been devised in the light of the above-described problems. It is an object of this invention to provide a technique to display an access path between a virtual volume of a storage controller that has an external storage connecting function, and an external volume of an external storage system.

In order to achieve the above-described object, the network topology display method of this invention is a method to display a network topology of a storage network that includes a storage controller with a virtual volume, and an external storage system with an external volume, wherein the external volume is mapped to the virtual volume. With this method, port connection information about an access path defined between the virtual volume and the external volume is collected. A first network address for identifying an access port of the storage controller on the access path is collected. Also, a second network address for identifying an access port of the external storage system on the access path is collected. Moreover, identification information for identifying the external volume is collected. Finally, the network topology between the virtual volume and the external volume is displayed based on the port connection information, the first network address, the second network address, and the identification information.

The storage controller includes not only one in a storage system such as a disk array apparatus, but also a virtualization switch that itself can be a Small Computer System Interface (SCSI) target. Examples of the identification information for identifying the external volume are: a World Wide Name (WWN) of an access port of the storage controller, an Logical Unit Number (LUN) number determined by a WWN of an access port of the external storage system; and mapping information for mapping the external volume of the external storage to the virtual volume of the storage controller.

Examples of information necessary to display the network topology between the virtual volume of the storage controller having the external storage connecting function, and the external volume of the external storage system include:

(1) storage network port connection information; and
(2) the following information about the external volume mapped to the virtual volume:
   (2a) identification information about an access port of the storage controller, such as a network address (e.g. WWN) of an initiator port (external connection port);
   (2b) identification information about an access port of the external storage system, such as a network address (e.g. WWN) of a target port;
   (2c) identification information about the external volume which is assigned to the access port of the external storage, such as the WWN of the storage controller access port and the LUN number determined by the WWN of the external storage system access port; and
   (2d) mapping information that shows which external volume is mapped to which virtual volume.

Information (1) makes it possible to display the topology of the storage network. By adding information (2a) and (2b) to information (1), it is possible to display the topology of a path from the storage controller access port to the external storage system access port. By the further addition of information (2c) and (2d), it is possible to display a mapping relationship between the virtual volume of the storage controller and the external volume of the external storage system.

The information necessary to display the network topology may be collected from network nodes at discovery, or at the occurrence of network failures.

Means for displaying the network topology can be realized by a network management program installed on a management server connected to each node of the storage network. The network management program collects information (1), (2a), (2b), (2c), and (2d) from the nodes, thereby displaying the network topology between the virtual volume of the storage controller having the external storage connecting function, and the external volume of the external storage system.

As for the display timing of the network topology, it is possible to employ a configuration where the network topology is displayed in response to an operator's instructions directed at an icon representing the virtual volume displayed on the screen.

The network management program can be either installed on a main memory, or stored on a storage medium in the management server. Examples of the storage medium include: optical recording media (optically readable recording media such as CD-RWs, CD-ROMs, DVD-RWs, DVD-ROMs, DVD-Rs, PD disks, MD disks, or MO disks); magnetic recording media (magnetically readable recording media such as flexible disks, magnetic cards, or magnetic tapes); and memory devices (for example, semiconductor memory devices such as DRAMs, or ferroelectric memory devices such as FRAMs).

This invention makes it possible to display an access path between the virtual volume of the storage controller having the external storage connecting function, and the external volume of the external storage system.

DETAILED DESCRIPTION OF THE INVENTION

Embodiments of this invention are described below in detail with reference to the attached drawings. The respective embodiments do not limit the scope of the claims and all characteristics described in the embodiments are not necessarily indispensable as the means for solving the problems of this invention.

Embodiment 1

Figure 1:
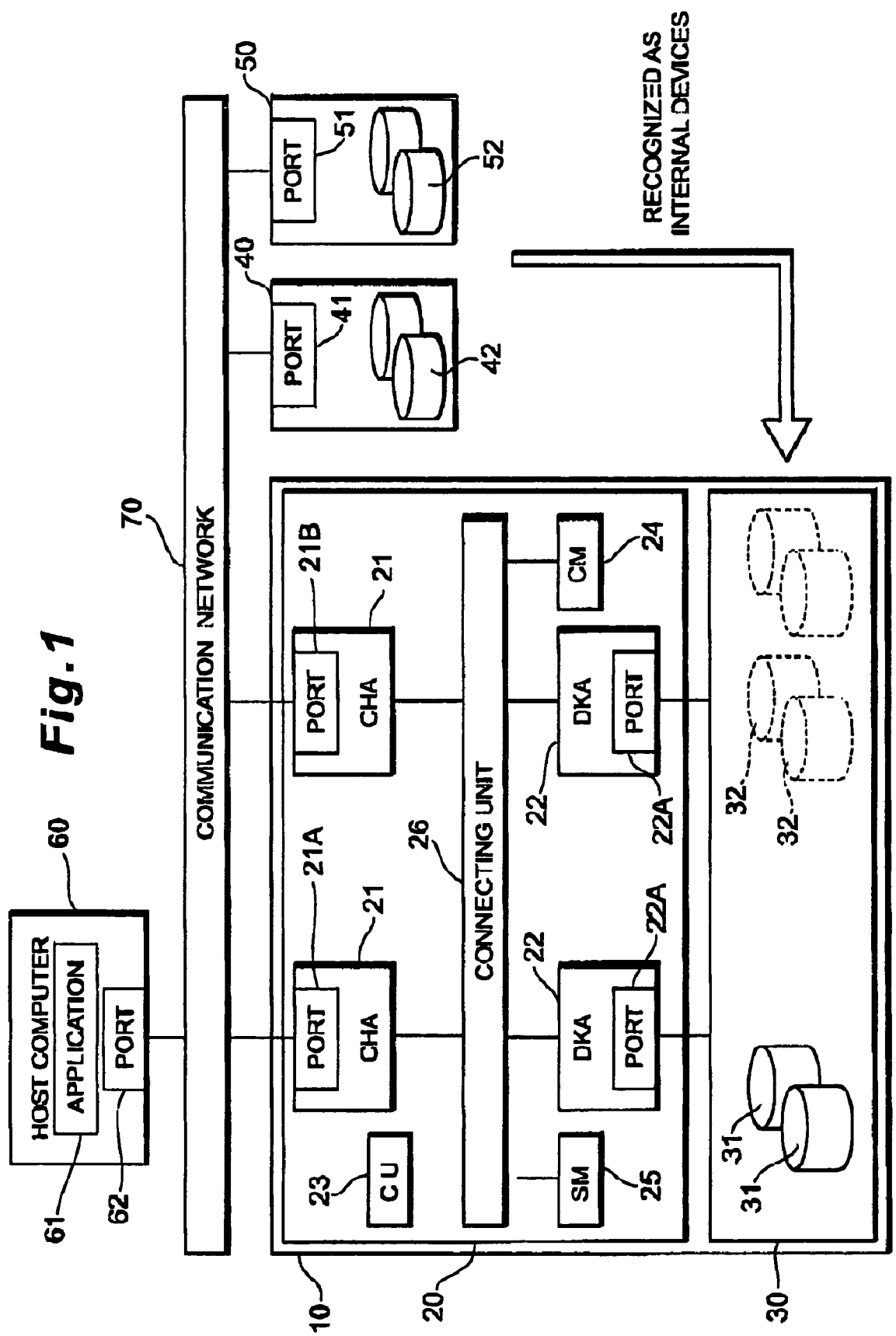
FIG. 1 is a network configuration diagram of a storage system according to Embodiment 1.

FIG. 1 shows a storage network configuration including, as a main component, a storage system 10 that has an external subsystem connecting function. A host computer 60 is a computer system equipped with information processing resources such as a CPU and memory. Specifically speaking, the host computer 60 is, for example, a workstation, a mainframe, or a personal computer. The host computer 60 contains: an application program 61 that utilizes storage resources provided by the storage system 10; and a port 62 for access via a communication network 70 to the storage system.

As the communication network 70, for example, a SAN (Storage Area Network), a LAN (Local Area Network), the internet, private lines, or public lines can be used as appropriate. If a SAN is employed as the communication network 70, the host computer 60 requests data input to or output from the storage system 10 according to Fibre Channel Protocol by inputting and outputting data in blocks, which are the units for data management in storage areas provided by a plurality of disk drives. In this case, a host bus adapter is used as the port 62 in the host computer 60. On the other hand, if a LAN is employed as the communication network 70, the host computer 60 requests data input to and output from the storage system 10 by inputting and outputting data in files, by designating a file name according to TCP/IP (Transmission Control Protocol/Internet Protocol). In this case, a LAN network card is used as the port 62 in the host computer 60.

Main components of the storage system 10 are a disk controller 20 and a storage unit 30. The disk controller 20 includes: a plurality of channel adapters (CHA) 21; a plurality of disk adapters (DKA) 22; a control unit (CU) 23; a cache memory (CM) 24; a shared memory (SM) 25; and a connecting unit 26.

Each channel adapter 21 includes a port 21A for performing data communication with the host computer 60. The channel adapter 21 is configured as a microcomputer system including CPUs and memory, and interprets and performs commands from the host computer 60. Each channel adapter 21 is assigned a network address, such as an IP address or a WWN (World Wide Name), for identifying itself, and can individually function as NAS (Network Attached Storage). When a plurality of host computers 60 exists, each channel adapter 21 can individually accept requests from all the host computers 60.

The storage system 10 also has an external subsystem connection port (or external port) 21B for connection via the communication network 70 to external storage systems 40 and 50. The external subsystem connection port 21B has an initiator function and is capable of issuing SCSI commands.

Each disk adapter 22 receives and sends data from and to storage devices 31 and 32 of the storage unit 30, and has a communication port 22A for connection to the storage devices 31 and 32. Also, each disk adapter 22 is configured as a microcomputer system including CPUs and memory. The disk adapter 22 writes data received by the channel adapter 21 from the host computer 60, at a specified address of a specified storage device 31 or 32 according to a write instruction from the host computer 60; or the disk adapter 22 reads data from a specified address of a specified storage device 31 or 32 according to a read instruction from the host computer 60 and returns the data to the host computer 60. In a case of data input/output to or from the storage devices 31 and 32, each disk adapter 22 translates a logical address into a physical address. If the storage devices 31 and 32 are managed by a RAID system, each disk adapter 22 has access to the relevant data according to the RAID configuration.

The control unit 23 controls operation of the entire storage system. The control unit 23 is connected to, for example, a management console (not shown in the drawing) and is configured 80 that it can detect the occurrence of failures within the system and make the console display them, and it can also perform processing to lock-out the system according to instructions from the console.

The cache memory 24 temporarily stores data that is input or output between the host computer 60 and the storage devices 31 and 32. Various commands from the host computer 60 are written to the shared memory 25, which is used to receive or send commands between the channel adapters 21 and the disk adapters 22, and to store, for example, system configuration information.

The connecting unit 26 mutually connects the following components: the respective channel adapters 21; the respective disk adapters 22; the control unit 23; the cache memory 24; and the shared memory 25. The connecting unit 26 is a very high speed crossbar switch or a high speed bus that transmits data via a high speed switching action.

The storage unit 30 includes a plurality of storage devices 31. Examples of the storage devices 31 include hard disks, flexible disks, magnetic tapes, semiconductor memories, and optical disks. If hard disks are employed as storage resources, it is possible to use disk drives such as ATA (Advanced Technology Attachment) disk drives, SCSI (Small Computer System Interface) disk drives, and Fibre Channel disk drives. The disk drives 32 indicated with a dotted line within the storage unit 30 show the state where storage devices 42 and 52 of the external storage systems 40 and 50 are incorporated into the storage system 10. In other words, the storage devices 32 are virtual storage devices. In Embodiment 1, the storage devices 42 and 52, which exist outside of the storage system 10, are recognized as internal storage devices of the storage system 10, and the storage resources of the external storage devices 42 and 52 are thereby provided to the host computer 60. Specifically speaking, the external storage devices 42 and 52 are provided as internal storage devices of the storage system 10 to the host computer 60 by mapping logical devices formed In the storage devices 42 and 52 to the virtual volumes of the storage system 10.

The external storage systems 40 and 50 respectively have ports 41 and 51 and are connected via the communication network 70 to the storage system 10. For ease of explanation, only the ports 41 and 51 and the storage devices 42 and 52 are shown as the internal components of the external storage systems 40 and 50, but the actual configuration of the external storage systems 40 and 50 is similar to that of the storage system 10.

Figure 2:
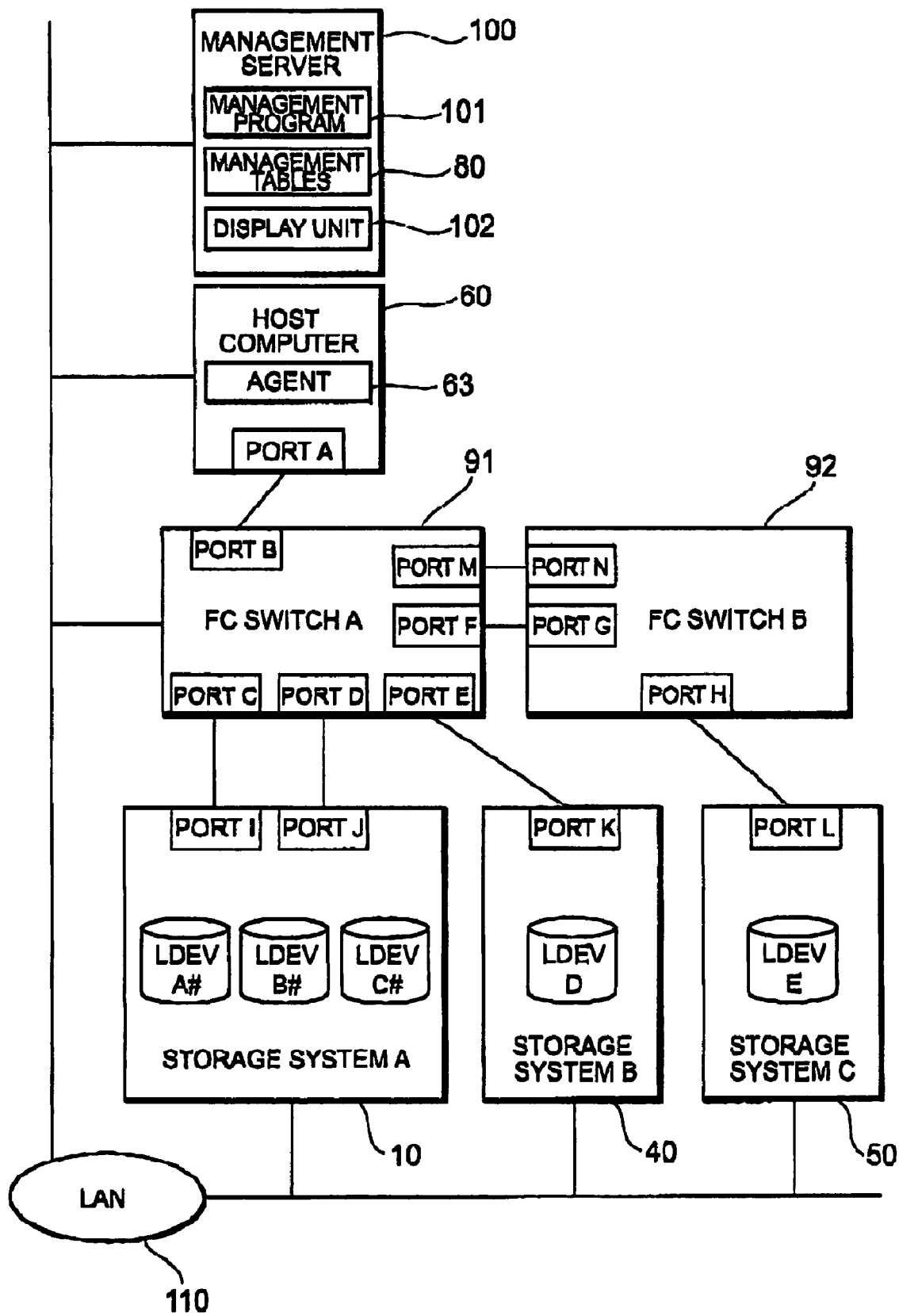
FIG. 2 is a system configuration diagram for management of the network environment according to Embodiment 1.

FIG. 2 shows a system configuration for managing a network environment of the storage system 10. The following description refers to an FC-SAN (Fibre Channel Storage Area Network) as an example of the communication network 70, but this invention can be also applied to other networks such as an IP-SAN (Internet Protocol Storage Area Network). For actual operation, the FC-SAN requires various kinds of network components such as FC switches, FC hubs, routers, gateways, and bridges. However, for ease of explanation of Embodiment 1, FC switches 91 and 92 are illustrated as examples of the network components of the FC-SAN.

The respective nodes that constitute the storage network (such as the host computer, the storage systems, and the FC switches) are connected via a LAN to a management server 100. The management server 100 is a computer system for managing the FC-SAN environment and has, for example, an FC-SAN configuration managing function, a failure managing function, and an access path managing function. The configuration managing function is performed by, for example, a network management program 101 described later in detail. The failure managing function and the access path managing function may be performed respectively by the network management program 101 or individually by other programs. These respective functions may be performed by the network management program 101 or other programs, or may be performed by the management server 100 hardware. Incidentally, the failure managing function and the access path managing function are incidental functions for the purpose of improved convenience in the management of the network, and are not essential for the present invention.

The FC-SAN configuration managing function is one to recognize the FC-SAN network topology by the network topology display method of this invention and to graphically display a logical connection relationship between the respective nodes by means of, for example, a GUI (Graphical User Interface). If the FC-SAN network configuration is changed by the addition or alteration of any node, the management server 100 can detect the network configuration change at the time of discovery by the network topology display method of this invention, and display the latest network topology view.

The failure managing function is one to automatically detect failure events occurring at the FC switches 91 and 92 and the storage systems 10, 40, and 50 and failure events regarding path lock-out occurring at the host computer 60 and to graphically display these failure events by means of, for example, a GUI. It is possible to employ a configuration where, if the storage systems 10, 40, or 50, or there are abnormalities in the FC switches 91 or 92, their respective exclusive maintenance screens are activated to execute fault diagnosis.

The access path managing function is one to manage access paths (or logical paths) from the host computer 60 to the storage systems 10, 40, and 50. If the operation environment has any problem such as an access-path disabled state, due to for example, false settings, security definition mistakes, or unplugged cables, it is possible to automatically detect such failures and to display them graphically by means of, for example, a GUI.

The management server 100 includes: the network management program 101 for performing the above-described respective functions: various kinds of management tables 80 for the FC-SAN configuration management; and a display unit 102 for displaying the network topology graphically. A storage device contained in the management server 100 stores the network management program 101 and the management tables 80. The management tables 80 are composed of: a node management table 81, a port management table 82, a host volume management table 83, an LDEV management table 84, an origin volume group management table 85, and a corresponding volume group management table 86.

The storage system 10 has logical volumes A#, B#, and C# that are formed in the storage devices 32. The storage system 40 includes logical volume D that is formed in the storage device 42. The storage system 50 includes logical volume E that is formed in the storage device 52. The storage system 10 maps a corresponding volume group consisting of the logical volume D and E to an origin volume group consisting of logical volumes A#, B#, and C#. This example shows a mapping relationship of 3:2, but this invention can be applied to a mapping relationship of m:n (where both m and n are natural numbers). In the above-described case, the term "origin volume group" indicates the volume group of the storage system 10 which is externally connected, and the term "corresponding volume group" indicates the volume group of the storage systems 40 and 50 which are external storage systems connected to the storage system 10. When the mark "#" is attached to a logical volume name in this specification, that logical volume means a virtual volume.

The host computer 60 includes an agent 63 for sending out information about the host computer 60 at the time of discovery by the management server 100. For the sake of convenience, the port in the host computer 60 is referred to as "port A."

The name of the storage system 10 is "storage system A," and the respective ports in the storage system 10 are called "port I" and "port J." "Port J" is an external subsystem connection port. The name of the storage system 40 is "storage system B," and the port in the storage system 40 is called "port K." The name of the storage system 50 is "storage system C," and the port in the storage system 50 is called "port L."

The name of the FC switch 91 is "FC switch A," and the respective parts in the FC switch 91 are called "port B," "port C," "port D," "port E," "port F," and "port M." The name of the FC switch 92 is "FC switch B," and the respective ports in the FC switch 92 are called "port G." "port H." and "port N."

The storage system 10 implements LUN masking of logical volume A# from port I to port A (or assigns port I and port A to logical volume A#). Specifically speaking, an access path is defined for the host computer 60 to have access from port A via port I to logical volume A#. Logical volume A# is associated with, for example, the "D: drive" of the host computer 60. The storage system 40 implements LUN masking of logical volume D from port K to port J. Specifically speaking, an access path is defined for the storage system 10 to have access from port J via port K to logical volume D. The storage system 50 implements LUN masking of logical volume E from port L to port J. Specifically speaking, an access path is defined for the storage system 10 to have access from port J via port L to logical volume E. The FC switches 91 and 92 perform routing between the ports in these access paths. With the route from port L to port J, there are two paths: L→H→G→F→D→J; and L→H→N→M→D→J.

Figure 3:
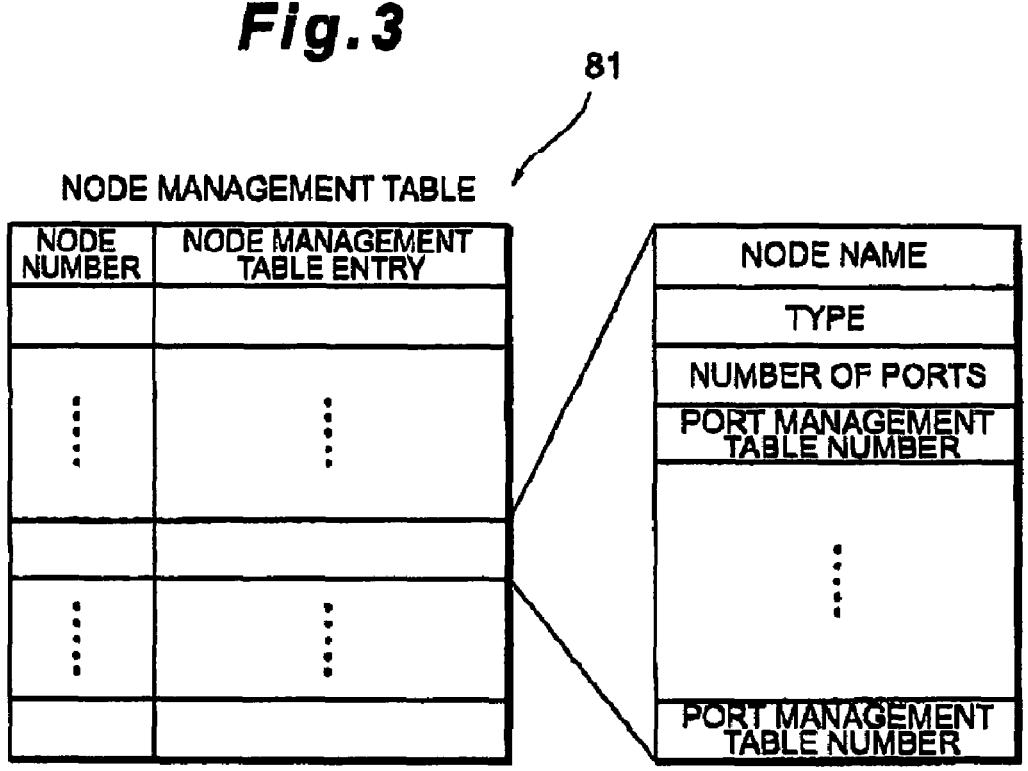
FIG. 3 is an explanatory drawing of a node management table.

FIG. 3 shows the nods management table 81. This table 81 is used to manage FC-SAN nodes; A node management table 81 entry stores the following information by associating it with a "node number": a "node name" that is the name of the relevant node; a "type" that indicates the node type (whether it is a host computer, an FC switch, a storage system, or other type of component); the "number of ports" in the node: and a "port management table number" for each port of the node. Each node management table entry is prepared based on information collected by the management server 100 from each node at the time of discovery. As an example of the node management table entry for the host computer 60, the "node name" is an "application server" which is the name of the host computer 60. The "type" is the "host computer." The "number of ports" is "1." The "port management table number" of port A is stored as the "port management table number."

Figure 4:
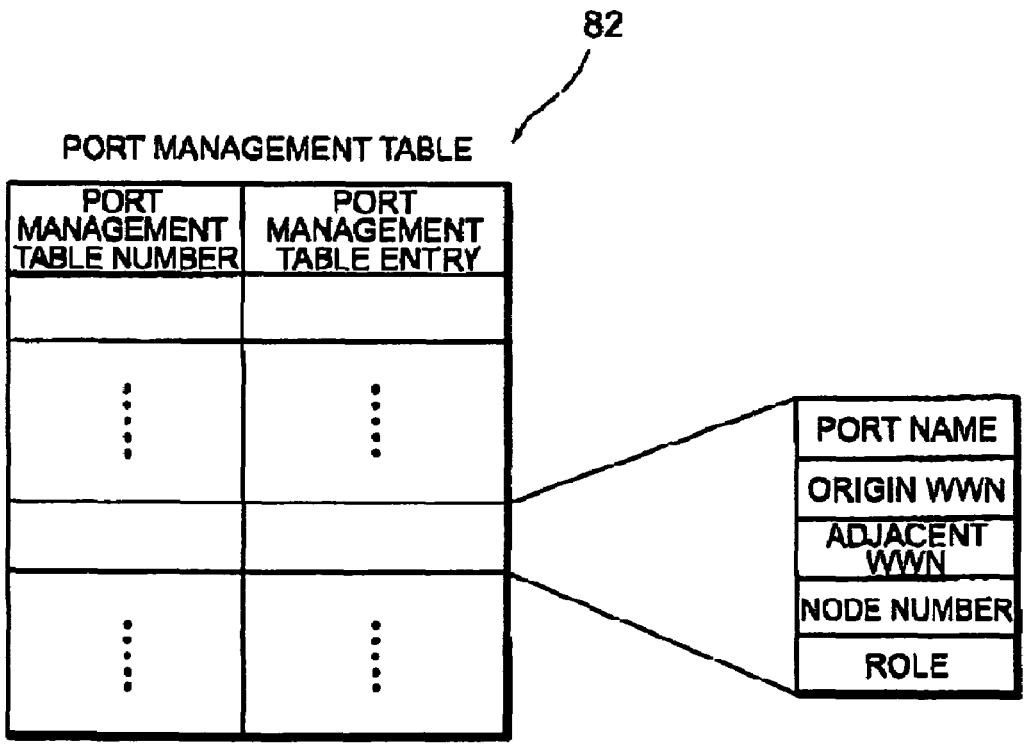
FIG. 4 is an explanatory drawing of a port management table.

FIG. 4 shows the port management table 82. This table 82 is used to manage the ports. A port management table 82 entry stores the following information by associating it with a "port management table number": a "port name" that is the name of the relevant port; an "origin WWN" that indicates the WWN of the port; an "adjacent WWN" that indicates the WWN of a port connected to the relevant port; a "node number" of the node to which the port belongs; and a "role" that indicates the function of the port (such as; initiator, target, or external connection port). Each port management table entry is prepared based on information collected by the management server 100 from each node at the time of discovery. As an example of the port management table entry for port I, the WWN of port I is stored as the "origin WWN" and the WWN of port C is stored as the "adjacent WWN." The node number of the node to which port I belongs (the storage system 10) is stored as the "node number." The role of port I (target) is stored as the "role."

Figure 5:
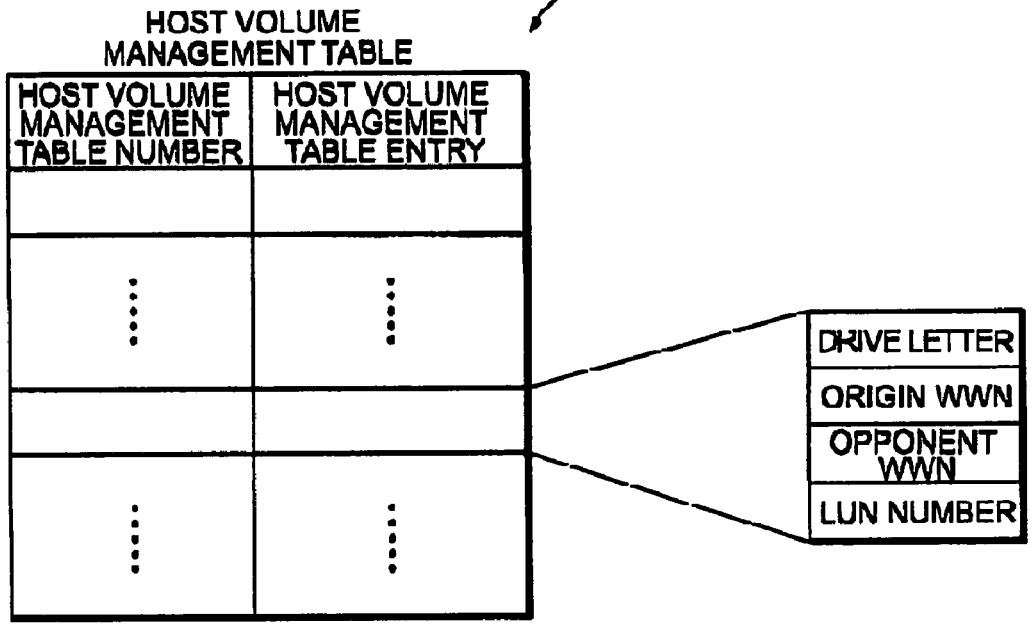
FIG. 5 is an explanatory drawing of a host volume management table.

FIG. 5 shows the host volume management table 83. This table 83 indicates the mapping relationship between drive letters in the host computer and logical volumes. A host volume management table 83 entry stores the following information by associating it with a "host volume management table number"; a "drive letter" in the host computer; an "origin WWN" that indicates a host computer access port WWN; an "opponent WWN" that indicates a storage system access port WWN; and an "LUN number" of a logical volume assigned from the storage system access port to the host computer access port. Each host volume management table entry is prepared based on information collected by the management server 100 from each node at the time of discovery. As an example of the host volume management table entry in the case of the "D: drive," the WWN of port A is stored as the "origin WWN" and the WWN of port I is stored as the "opponent WWN." The LUN number of logical volume A# as determined by the "origin WWN" and the "opponent WWN" is stored as the "LUN number."

Figure 6:
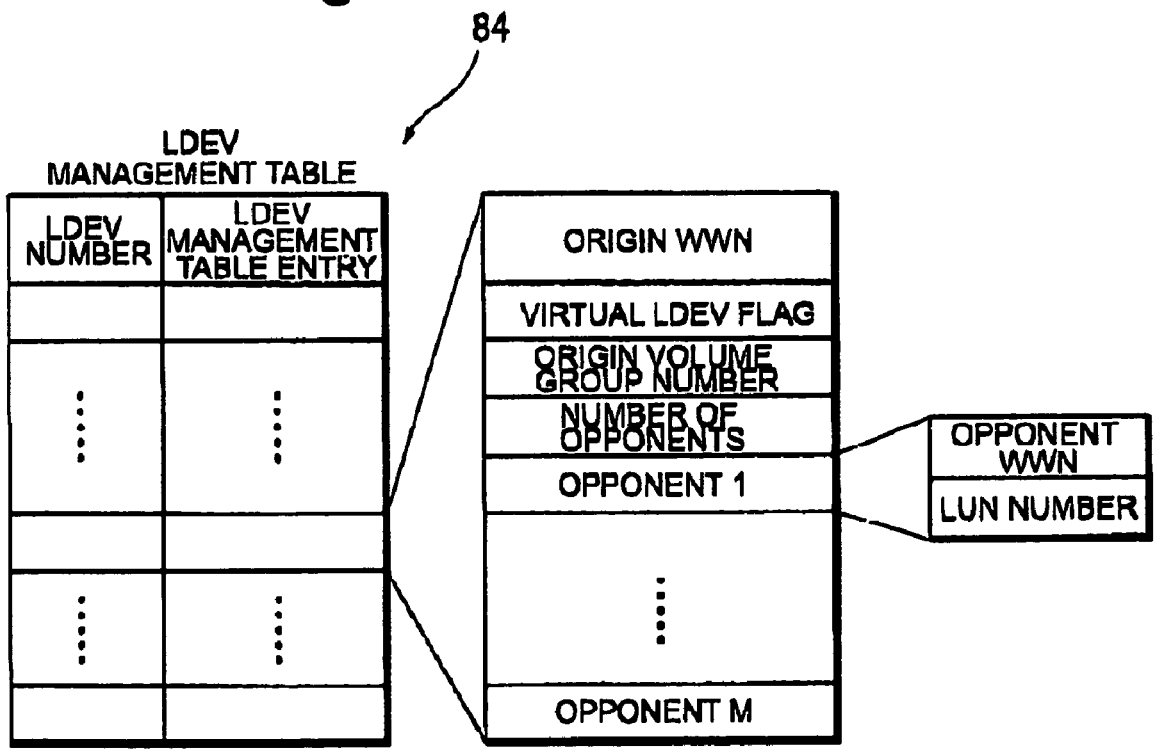
FIG. 6 is an explanatory drawing of an LDEV management table.

FIG. 6 shows the LDEV management table 84. This table 84 is used to manage the mapping relationship between a host computer access port and a storage system access port with regard to each storage system logical volume. An LDEV management table 84 entry stores the following information by associating it with an "LDEV number": an "origin WWN" that indicates an origin subsystem access port WWN; a "virtual LDEV flag" that shows whether the relevant logical volume is a virtual volume or not; an "origin volume group number" that indicates the number of an origin volume group to which the logical volume belongs; the "number of opponents" that shows the number of host computer access ports; an "opponent WWN" that indicates a host computer access port WWN; and an "LUN number" of the logical volume as determined by the "origin WWN" and the "opponent WWN." For ease of explanation, in Embodiment 1, one subsystem port and one or more host ports are assigned to one logical volume. However, this invention can be applied to a storage system that can assign a plurality of subsystem ports and a plurality of host ports to the logical volume. Each LDEV management table entry is prepared based on information collected by the management server 100 from each node at the time of discovery. As an example of the LDEV management table in the case of the logical volume A#, the WWN of port I is stored as the "origin WWN." The "virtual LDEV flag" stores the value indicates that it's a virtual volume. The number of the origin volume group to which logical volume A# belongs is stored as the "origin volume group number." The LUN number of logical volume A# as determined by the "origin WWN" and the "opponent WWN" is stored as the "LUN number."

Figure 7:
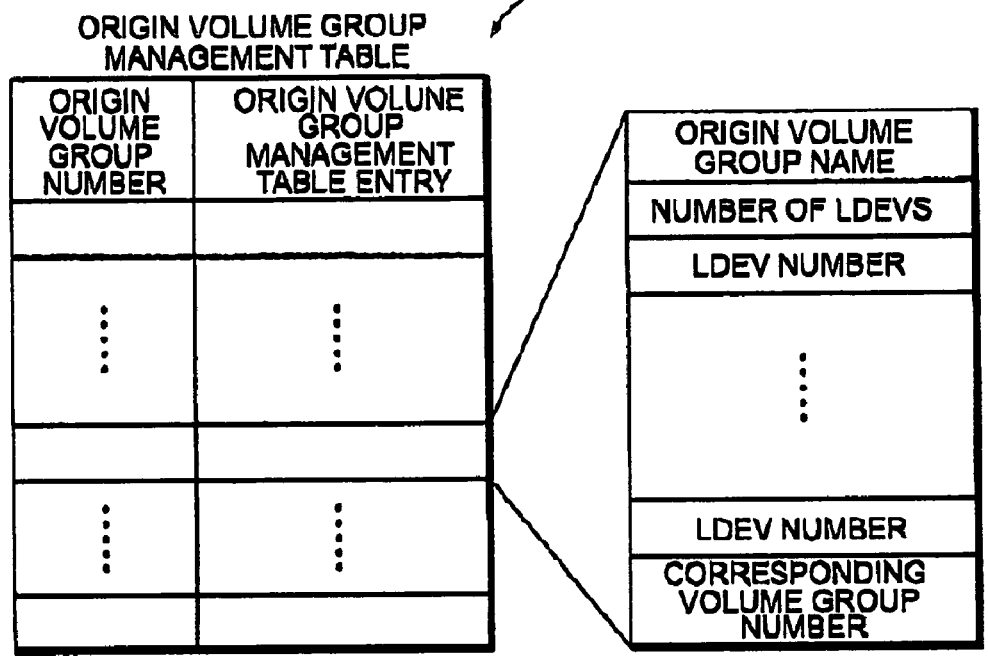
FIG. 7 is an explanatory drawing of an origin volume group management table.

FIG. 7 shows the origin volume group management table 85. This table 85 is used to manage origin volume groups. An origin volume group management table 85 entry stores the following information by associating it with an "origin volume group number": an "origin volume group name" that indicates the name of the origin volume group; the "number of LDEVs" that indicates the number of logical volumes belonging to the origin volume group; "LDEV numbers" of the logical volumes belonging to the origin volume group; and a "corresponding volume group number" that indicates the number of a corresponding volume group mapped to the origin volume group. Each origin volume group management table entry is prepared based on information collected by the management server 100 from each node at the time of discovery.

Figure 8:
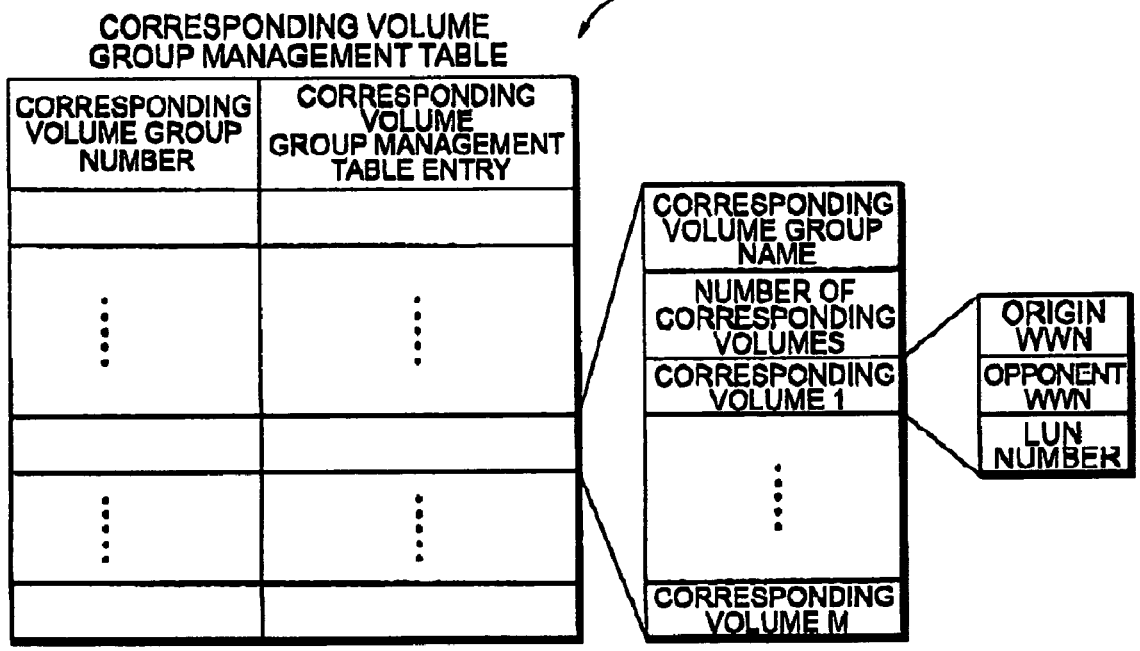
FIG. 8 is an explanatory drawing of a corresponding volume group management table.

FIG. 8 shows the corresponding volume group management table 86. This table 86 is used to manage corresponding volume groups. A corresponding volume group management table 86 entry has the following information by associating it with a "corresponding volume group number": a "corresponding volume group name" that indicates the name of the corresponding volume group; the "number of corresponding volumes" that indicates the number of logical volumes belonging to the corresponding volume group; an "origin WWN" that indicates an origin subsystem external connection port WWN; an "opponent WWN" that indicates an external subsystem port WWN; and an "LUN number" of the corresponding volume as determined by the "origin WWN" and the "opponent WWN." Each corresponding volume group management table entry is prepared based on information collected by the management server 100 from each node at the time of discovery.

Figure 9:
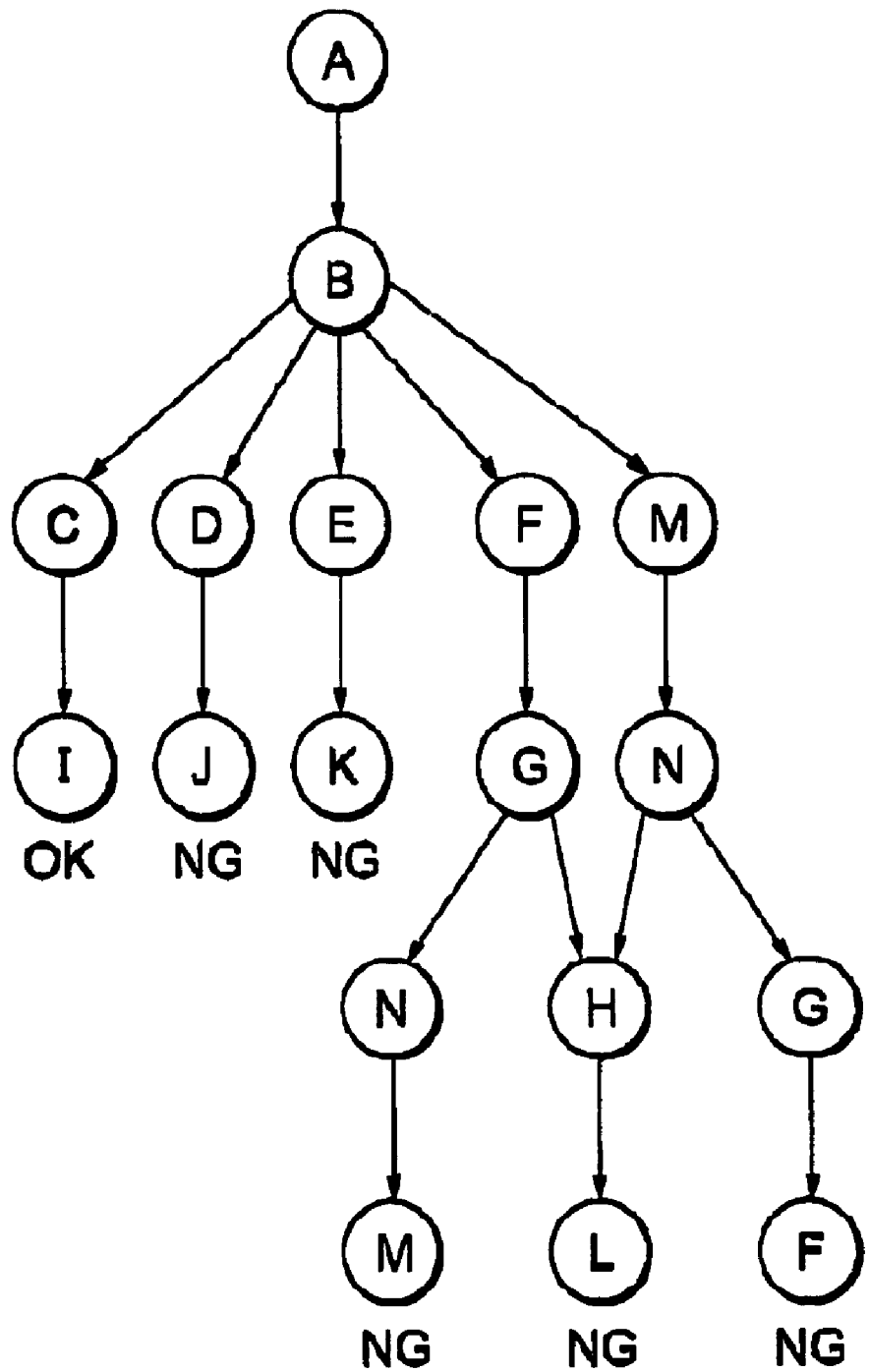
FIG. 9 is a schematic explanatory drawing of an access path search algorithm.
Figure 10:
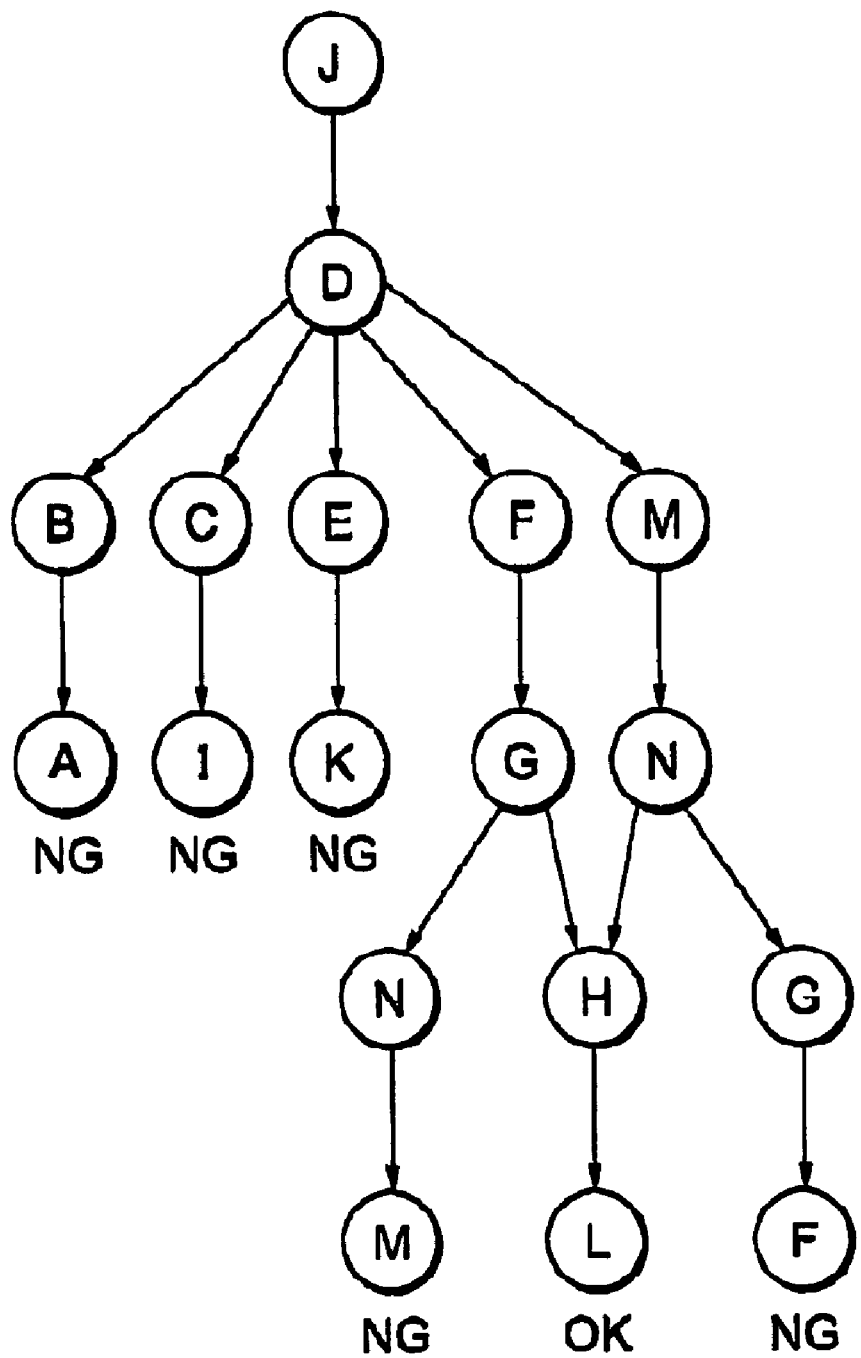
FIG. 10 is a schematic explanatory drawing of another access path search algorithm.

The access path search algorithm for analyzing the FC-SAN network topology is described below with reference to FIGS. 9 and 10. This algorithm applies the following three rules to search for access paths: (1) proceed to a port connected by a cable or to a port within the same switch; (2) if an access path loops to the same device, remove that access path from consideration as a candidate, and (3) if the terminal port does not coincide with the target port, remove that access path from consideration as a candidate. FIG. 9 shows the process to search for an access path from port A to port I. With path A→B→D→J, path A→B→E→K, and path A→B→F→G→H→L, none of their terminal ports coincide with the target port and, therefore, these three paths are removed from consideration as candidates. In path A→B→F→G→N→M and path A→B→M→N→G→F, both of them loop to the same switch 91 and, therefore, these paths are also removed from consideration as candidates, As a result, path A→B→C→I is the only path that has been searched for. FIG. 10 shows the process to search for an access path from port J to port L. With path J→D→B→A, path J→D→C→I, and path J→D→E→K, none of their terminal ports coincide with the target port, and therefore these three paths are removed from consideration as candidates. In path J→D→F→G→N→M and path J→D→M→N→G→F, both of them loop to the same switch 91 and, therefore, these paths are also removed from consideration as candidates. As a result, path J→D→F→G→H→L and path J→D→M→N→H→L are the only paths that have been searched for.

Figure 11:
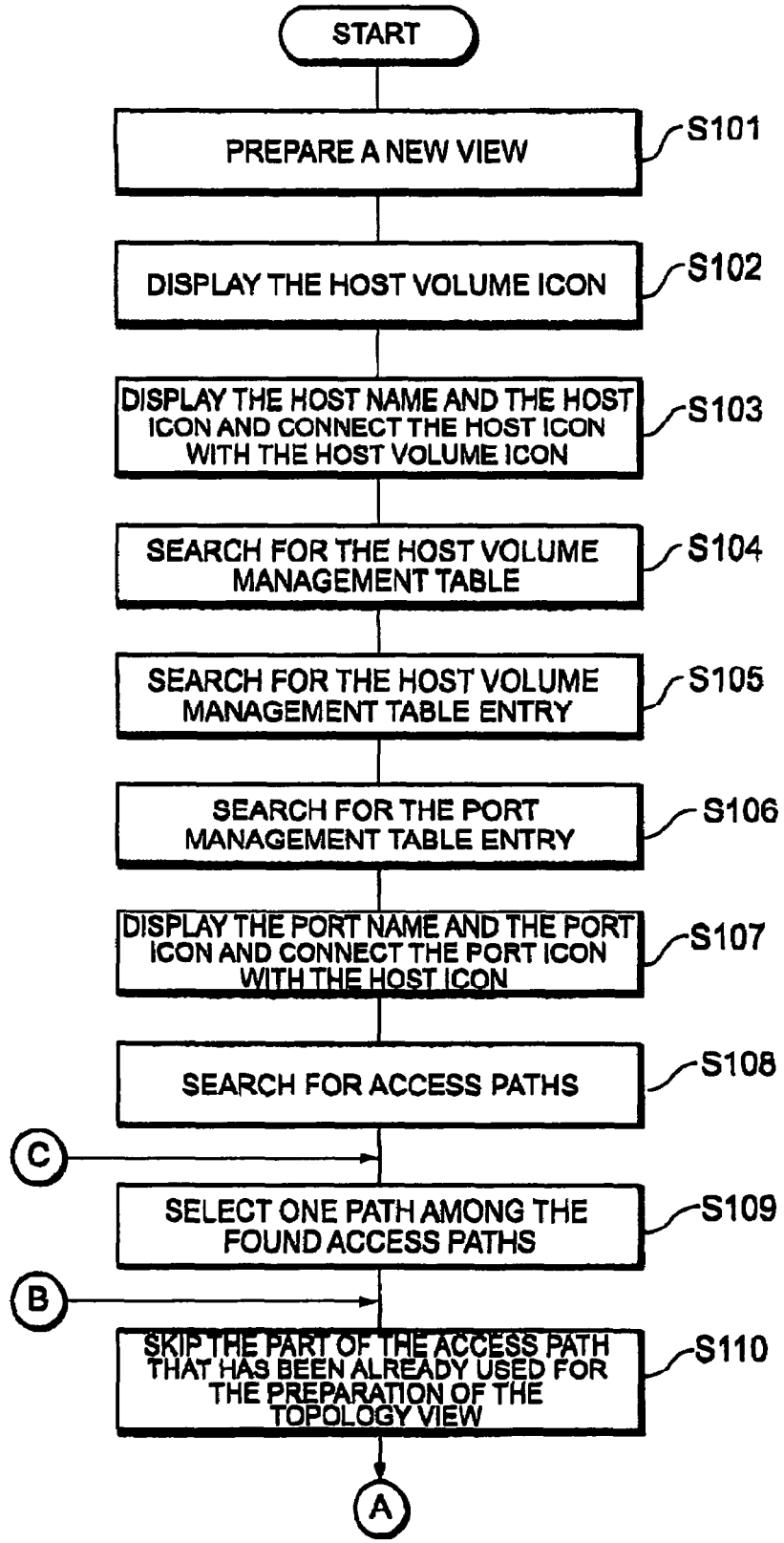
FIG. 11 is a flowchart of processing for a host volume topology display.
Figure 12:
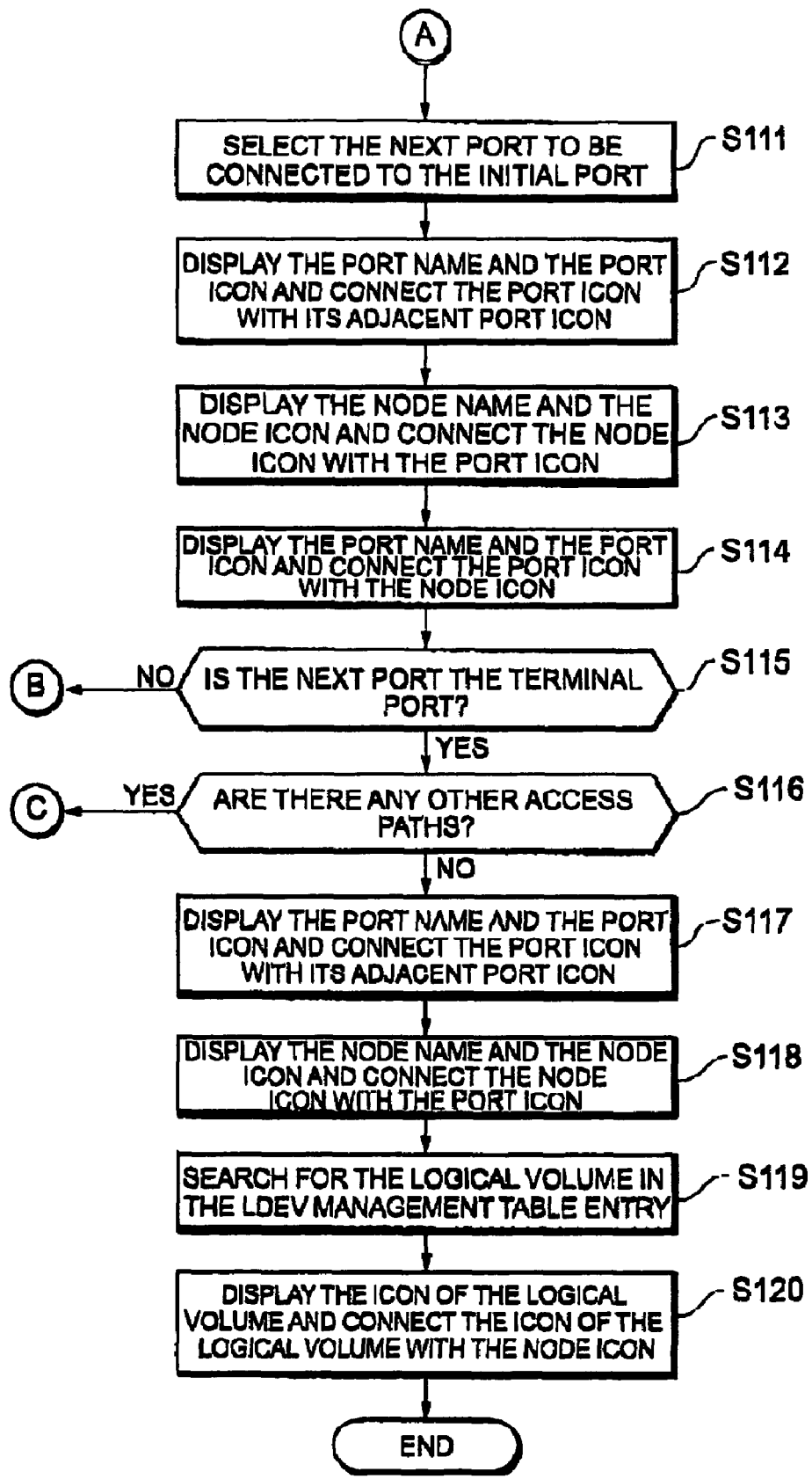
FIG. 12 is a flowchart of processing for the host volume topology display.
Figure 13:
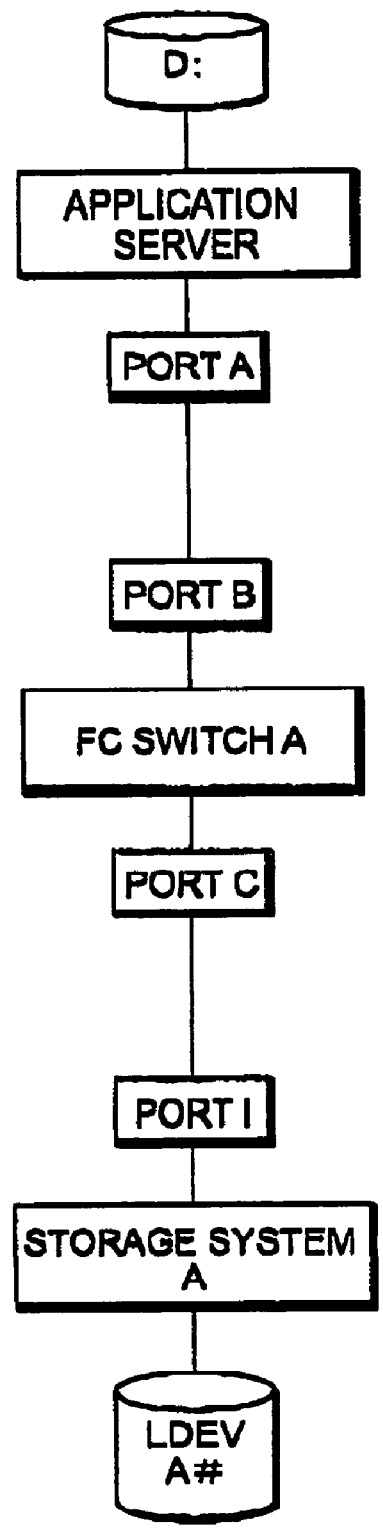
FIG. 13 is a display example of a host volume topology view.

Now the procedures to prepare an FC-SAN network topology view are described below with reference to the relevant drawings. FIG. 13 shows a topology view to be displayed when an operator designates "D: drive" of the host computer 60 and selects to show its end-to-end host volume topology view. FIGS. 11 and 12 are flowcharts that show the procedures to display the topology view.

When an operator operates the management server 100 to designate "D: drive" of the host computer 60 and select the and-to-end topology view display, the management server 100 prepares a new view to display the designated topology view (S101) and displays a host volume icon (S102). In this example, it displays the host volume icon of "D: drive." Then the management server 100 searches the node management table 81 for the node management table entry for the host computer 60, displays the name "application server" for the host computer 60 and its host icon, and connects this host icon with the host volume icon (S103).

Subsequently, the management server 100 searches the host volume management table 83 corresponding to the host computer 60 (S104), and searches the table 83 for the host volume management table entry corresponding to the designated drive letter (S105). In this example, it searches for the host volume management table entry corresponding to "D: drive." The management server 100 then searches the port management table 82 for the port management table entry that has the "origin WWN" that coincides with the "origin WWN" of the host volume management table entry (S106). In this example, the "origin WWN" is the WWN of port A. Accordingly, the port management table entry that has the "origin WWN" that coincides with the port A WWN is searched for. Next, the management server 100 displays the "port name" stored in the port management table entry and its port icon, and connects this port icon with the host icon (S107).

Then, the management server 100 searches for access paths from the "origin WWN" to the "opponent WWN," which is stored in the host volume management table entry (S108). In this example, it searches for the access path from port A to port I. As described above, the access path from port A to port I is as follows: port A→port B→port C→port I. Next, the management server 100 selects one of the found access paths (S109). In this example, there is only one access path from port A to port I. The management server 100 then skips the part of the access path that has already been used for drawing the topology view (S110).

Subsequently, the management server 100 selects the next port to be connected to the initial port (S111). In this example, it selects port B. The management server 100 displays the "port name" of the selected port and its port icon, and connects this port icon with its adjacent port icon (S112). In this example, it displays the port B icon and connects the port B icon with the port A icon.

Next, the management server 100 searches for the port management table entry that stores the port name of the selected port, searches for the node management table entry for the "node name" of the node to which the selected port belongs—according to the "node number" in the port management table entry, displays the "node name" and its node icon, and connects this node icon with the port icon (S113). In this example, it displays the icon for FC switch A, to which port B belongs, as the node icon, and connects the FC switch A icon with the port B icon.

Subsequently, the management server 100 selects the next port, displays the "port name" of the next port and its port icon, and connects this port icon with the node icon (S114). In this example, it displays the port C icon and connects the port C icon with the FC switch A icon.

The management server 100 then determines whether the next port is the terminal port or not (S115). In this example, port I is the terminal port. If the next port is not the terminal port (S115: NO), the procedures S110 to S114 are repeated. If the next port is the terminal port (S115: YES), the management server 100 determines if there is any other access path that has not been selected (S116). If another access path exists (S116: YES), procedures S109 to S115 are repeated. In this example, there is only one access path.

If there is no other access path (S116: NO), the management server 100 displays the "port name" of the terminal port and its port icon and connects this port icon with its adjacent port icon (S117). In this example, it displays the port I icon and connects the port I icon with the port C icon. Then, the management server 100 searches for the port management table entry, which stores the port name of the terminal port, for the "node number" of the node to which the terminal port belongs, searches for the node management table entry for the "node name" of the node corresponding to this "node number," displays the "node name" and its node icon, and connects this node, icon with the port icon (S118). In this example, it displays the icon for storage system A, to which port I belongs, and connects the storage system A icon with the port I icon.

Subsequently, the management server 100 searches for the LDEV management table entry for the logical volume that has the "opponent WWN," "origin WWN," and "LUN number" respectively coinciding with the "origin WWN," "opponent WWN," and "LUN number" stored in the host volume management table entry corresponding to the designated drive letter (S119). The management server 100 then displays the icon of the logical volume; and, if the logical volume is a virtual volume, the management server 100 displays its volume name with the mark "#" attached thereto, and connects this logical volume icon with the node icon (S120). In this example, the LUN number determined by the WWN of port A and the WWN of port I indicates logical volume A# and, therefore, the management server 100 displays the icon of LDEV A# and connects this icon with the icon of storage system A. The network topology view shown in FIG. 13 is displayed via the above-described procedures.

Figure 14:
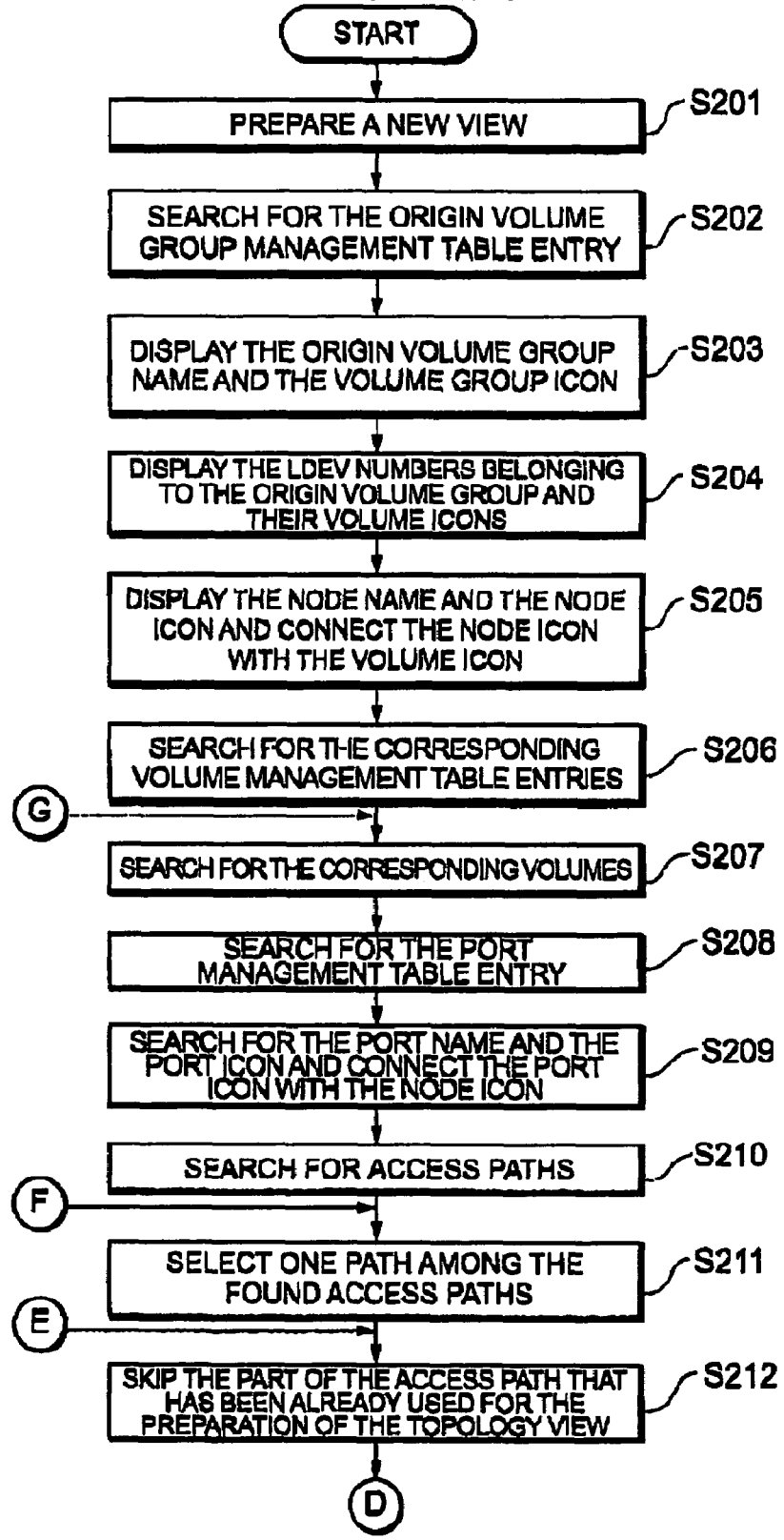
FIG. 14 is a flowchart of processing for an external connection topology display.
Figure 15:
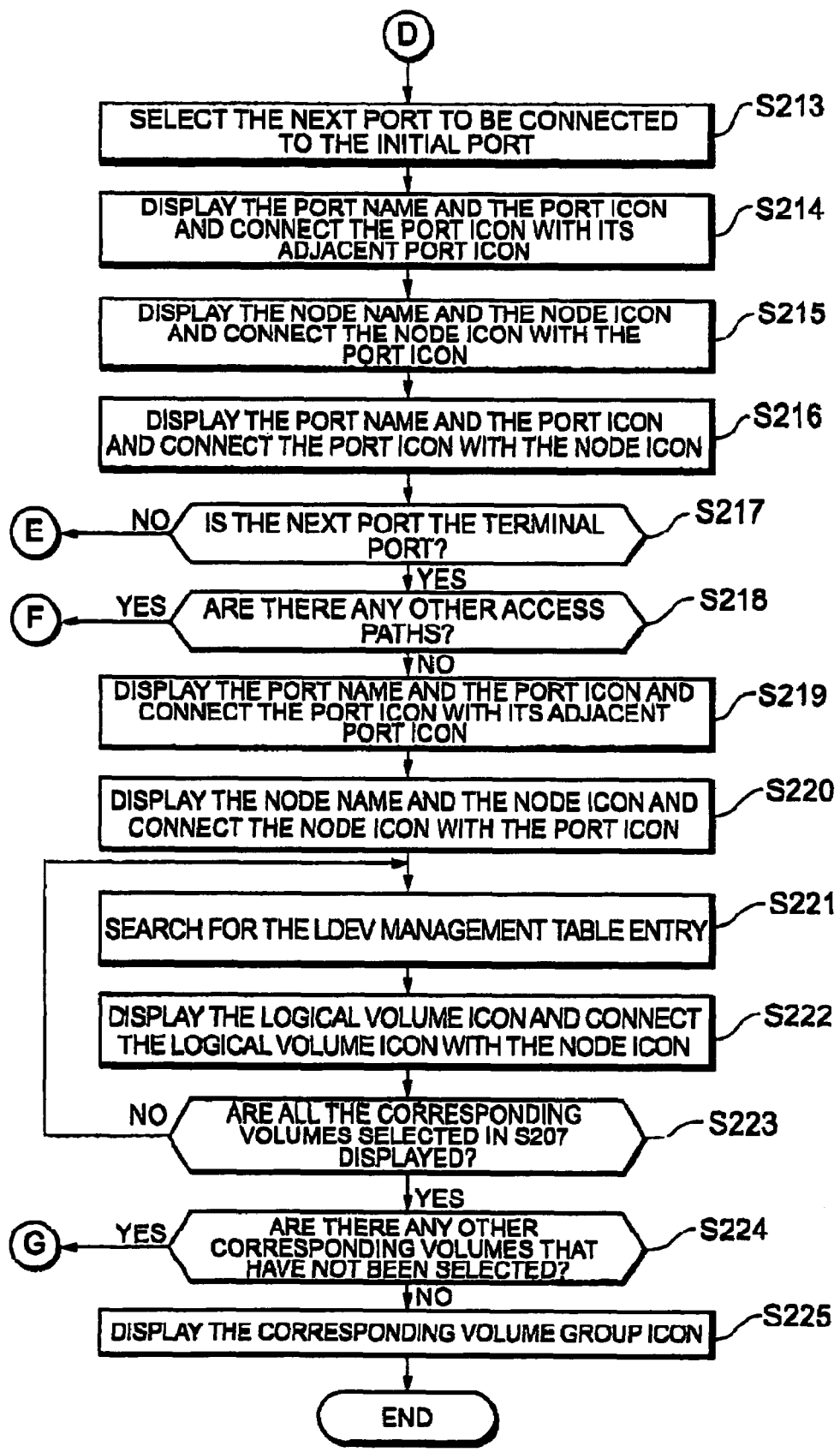
FIG. 15 is a flowchart of processing for the external connection topology display.
Figure 16:
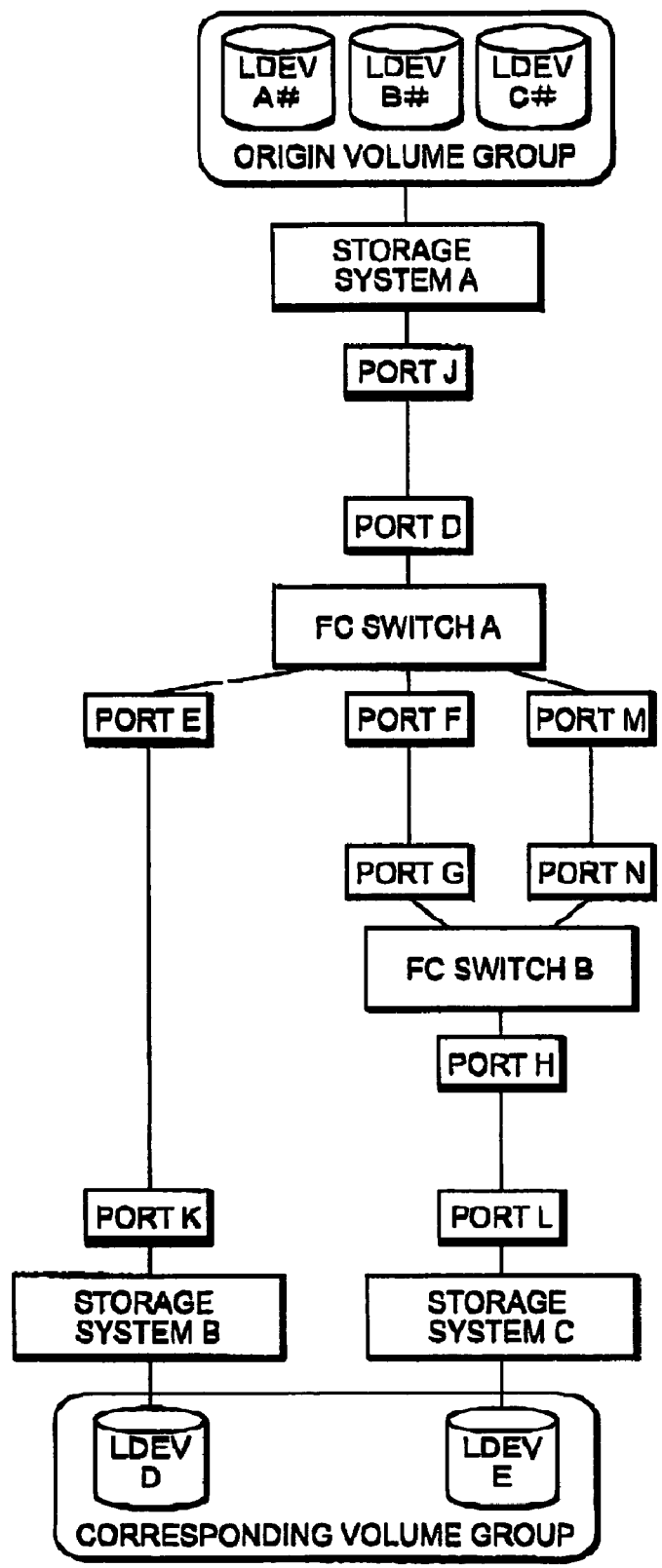
FIG. 16 is a display example of an external connection topology view.

FIG. 16 shows a topology view to be displayed when an operator designates "logical volume A#" and selects to display an end-to-end topology view for external connection. FIGS. 14 and 15 are flowcharts that show the procedures to display the topology view of the external connection.

When an operator uses the management server 100 and specifies an instruction at the icon for logical volume A# in the storage system 10 to select the end-to-end topology view display, the management server 100 prepares a new view to display the designated topology view (S201). Then, the management server 100 searches for the origin volume group management table entry having the LDEV number that coincides with the LDEV number of the designated logical volume (S202), and the management server 100 displays the "origin volume group name" and its volume group icon (S203). Next, the management server 100 refers to the origin volume group management table entry and displays the "LDEV numbers" belonging to the origin volume group and their volume icons (S204). In this example, the respective volume icons of LDEV A#, LDEV B#, and LDEV C# are displayed.

Subsequently, the management server 100 displays the "node name" of the storage system 10 and its node icon, and connects this node icon with the volume group icon (S205). In this example, it displays the storage system A icon and connects the storage system A icon with the volume group icon.

The management server 100 then searches for the corresponding volume group management table entry according to the "corresponding volume group number" stored in the origin volume group management table entry (S206). In this example it searches for the corresponding volume group entry that has corresponding volumes of the port J "as origin WWN," the port K as "opponent WWN," and the logical volume D as "LUN number," and of the port J as "origin WWN," the port L as "opponent WWN," and the logical volume E as "LUN number."

Subsequently, the management server 100 searches the corresponding volume group management table entry for the corresponding volumes whose "origin WWN," "opponent WWN," and "LUN number" coincide with the WWN of an access port of an externally connecting storage system, and the WWN and the "LUN number" of an access port and a volume of an externally-connected storage system (S207). In this example, logical volumes D and E are found by the search.

The management server 100 then searches for the port management table entry corresponding to the "origin WWN" (S208), displays the "port name" of the port having the "origin WWN" and its port icon, and connects this port icon with the node icon (S209). In this example, it displays the "port J", its icon and connects the port J icon with the storage system A icon.

Next, the management server 100 searches for an access path from the "origin WWN" to the "opponent WWN" which is stared in the corresponding volume management table entry (S210). The management server 100 uses the algorithm described before for the searches. In this example, it searches for the access path from port J to port K The access path from port J to port K is as follows: port J→port D→port E→port K. Next, the management server 100 selects one of the found access paths (S211). In this example, there is only one access path from port J to port K The management server 100 then skips the part of the access path that has already been used for drawing the topology view (S212).

Subsequently, the management server 100 selects the next port to be connected to the initial port (S213). In this example, it selects port D. The management server 100 displays the "port name" of the selected part and its port icon, and connects this port icon with its adjacent port icon (S214). In this example, it displays the port D icon and connects the port D icon with the port J icon.

Next, the management server 100 searches for the port management table entry that stores the port name of the selected port, searches the node management table entries for the "node name" of the node to which the selected port belongs—according to the "node number" in the port management table entry, displays the "node name" and its node icon, and connects this node icon with the port icon (S215). In this example, it displays the icon for FC switch A, to which port D belongs, as the node icon, and connects the FC switch A icon with the port D icon.

Subsequently, the management server 100 selects the next port in the selected path, displays the "port name" of the next port and its port icon, and connects this port icon with the node icon (S216). In this example, it displays the port E icon and connects the port E icon with the FC switch A icon.

The management server 100 then determines whether the next port is the terminal port or not (S217). In this example, port K is the terminal port. If the next port is not the terminal port (S217; NO), the procedures S212 to S216 are repeated. If the next port is the terminal port (S217: YES), the management server 100 determines if there is any other access path that has not been selected (S218). If another access path exists (S218: YES), procedures S211 to S217 are repeated. In this example, there is only one access path.

If there is no other access path (S218: NO), the management server 100 displays the "port name" of the terminal port and its port icon and connects this port icon with its adjacent port icon (S219). In this example, it displays the port K icon and connects the port K icon with the port E icon. Then, the management server 100 searches for the port management table entry, which stores the port name of the terminal port, for the "node number" of the node to which the terminal port belongs, searches for the node management table entry for the "node name" of the node corresponding to this "node number," displays the "node name" and its node icon, and connects this node icon with the port icon (S220). In this example, it displays the icon for storage system B, to which port K belongs, and connects the storage system B icon with the port K icon.

Subsequently, the management server 100 searches for the LDEV management table entry for the logical volume that has the "opponent WWN," "origin WWN," and "LUN number" respectively coinciding with the "origin WWN," "opponent WWN," and "LUN number" stored in the corresponding volume management table entry (S221). The management server 100 then displays the icon of the logical volume; and, if the logical volume is a virtual volume, the management server 100 displays its volume name with the mark "#" attached thereto, and connects this logical volume icon with the node icon (S222). In this example, the LUN number determined by the port J WWN and the port K WWN indicates logical volume D and, therefore, the management server 100 displays the LDEV D icon and connects this icon with the storage system B icon.

Subsequently, the management server 100 checks if all the corresponding volumes selected in 8207 are displayed (S223). If there is any corresponding volume that is not displayed (S223: NO), procedures S221 to S222 are repeated. The management server 100 then checks if there is any corresponding volume that has not been selected (S224). In this case, logical volume E has not been selected, if there is any corresponding volume that has not been selected (S224: YES), procedures S207 to S223 are repeated. Consequently, the topology view from port J to port L is prepared. As described above, the resulting access paths are as follows; port J→port D→port F→port G→port H→port L; and port J→port D→port M→port N→port H→port L. If all the procedures to display the corresponding volumes are completed (S224; NO), the management server 100 displays the corresponding volume group icon (S225). The network topology view shown in FIG. 16 is displayed through the above-described procedures.

Figure 17:
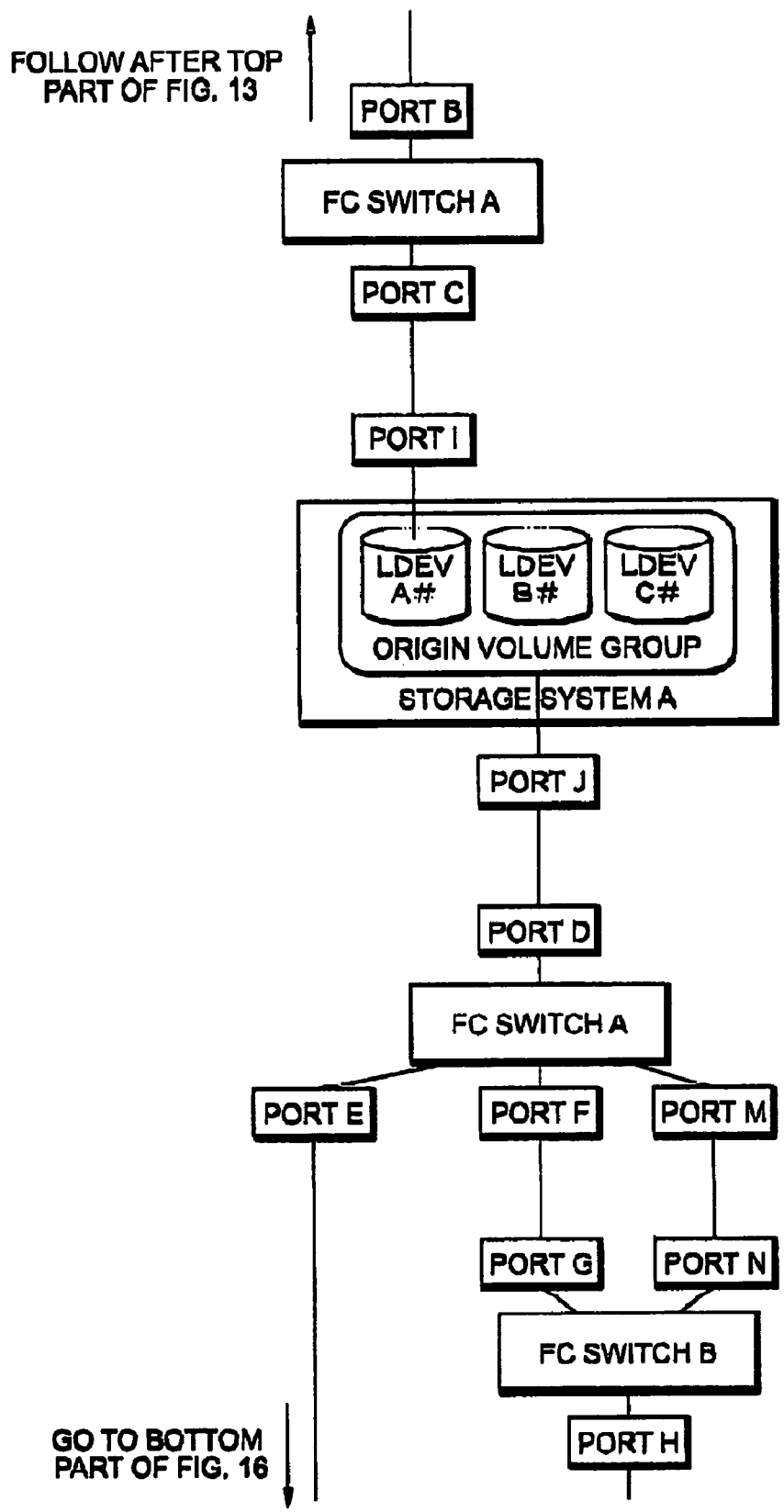
FIG. 17 is a display example of a topology view.

The end-to-and host volume topology view shown in FIG. 13 and the end-to-end external connection topology view shown in FIG. 16 may be displayed in a different window or in the same window. For example, when an operator first designates "D: drive" of the host computer 60, selects the end-to-end host volume topology view, displays the topology view from the host computer 60 to the storage system 10, and then directs an instruction at the icon of logical volume A# to display the end-to-end external connection topology view, the topology view of the external connection part is also displayed, as shown in FIG. 17.

The above description is about the example where the end-to-end external connection topology view is displayed by the operator's instructions. However, this invention may be configured so that once the management server 100 detects the occurrence of a failure (or event) in the storage network, it automatically recognizes the network topology of the part with the failure and displays it on the display unit 102. For example, it is possible to employ a configuration where the attention of the operator would be visually attracted by, for example, displaying the icon of the node with the failure in red. It is also possible to display, for example, the cause of the failure. It is desirable that in displaying the network topology, the icons of the respective nodes and ports are laid out at coordinate positions that are easily and visually recognizable.

Embodiment 2

Embodiment 2 describes a network topology view display when external storage systems are cascade-connected. Specific procedures to prepare the FC-SAN network topology view are similar to those described above and thereby omitted.

Figure 18:
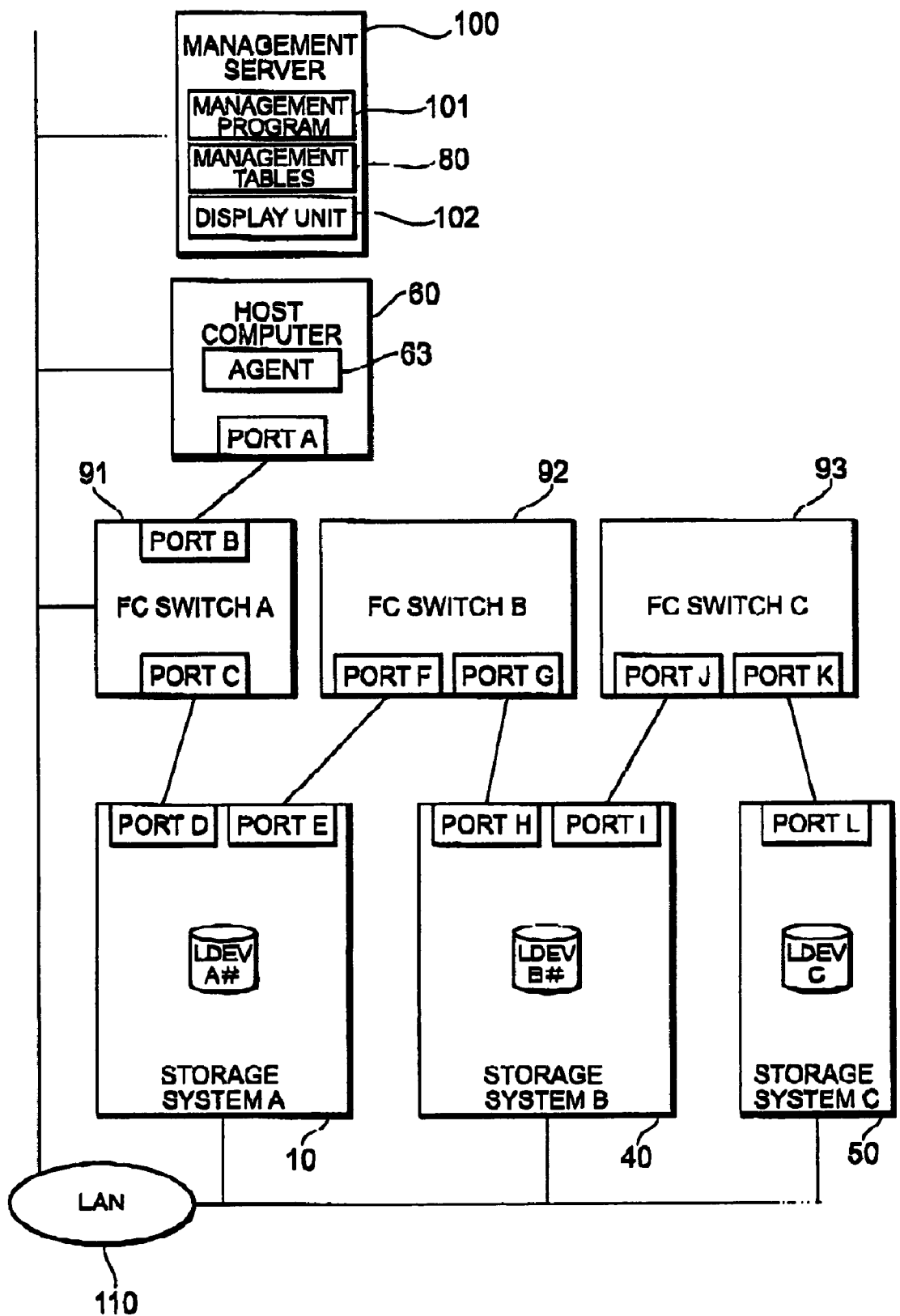
FIG. 18 is a network configuration diagram of a storage system according to Embodiment 2.

FIG. 18 shows the FC-SAN network configuration where the external storage systems are cascade-connected. Logical volume A# of the storage system 10 is mapped to logical volume B# of storage system B. Logical volume B# of the storage system 40 is mapped to logical volume C of the storage system 50. Specifically speaking, the storage system 40 implements LUN masking of logical volume B# from port H to port E, and an access path is defined for the storage system 10 to have access from port E via port H to logical volume B#. Also, the storage system 50 implements LUN masking of logical volume C from port L to port I, and an access path is defined for the storage system 40 to have access from port I via port L to logical volume C.

Figure 19:
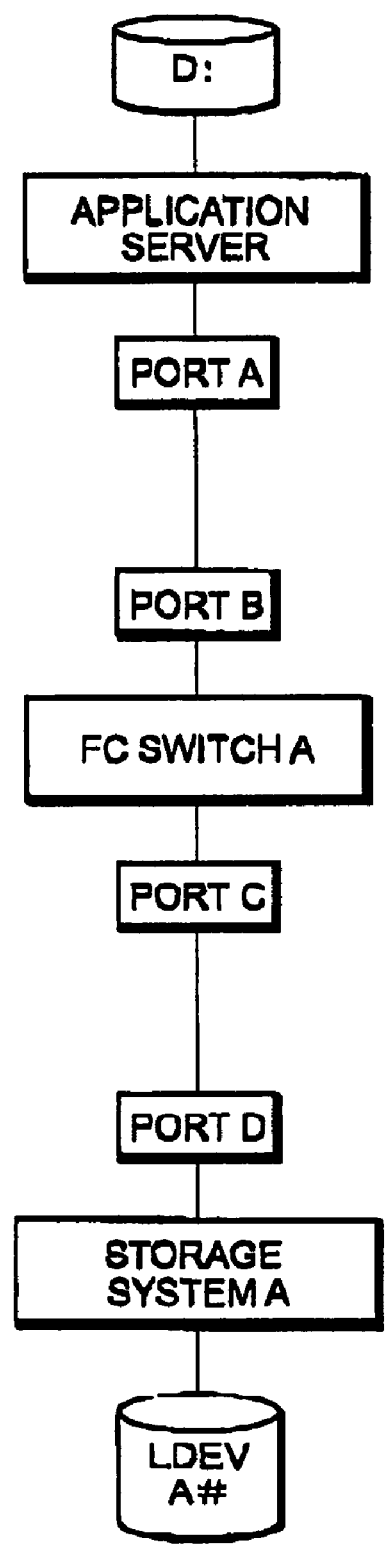
FIG. 19 is a display example of the host volume topology view.
Figure 20:
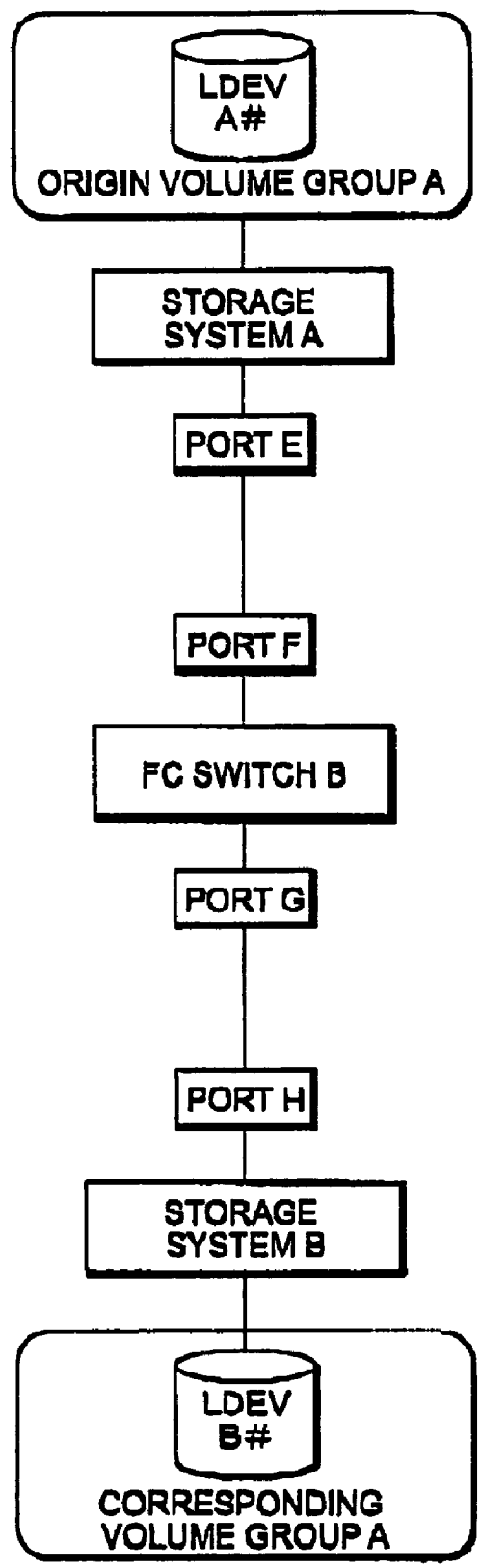
FIG. 20 is a display example of the external connection topology view.
Figure 21:
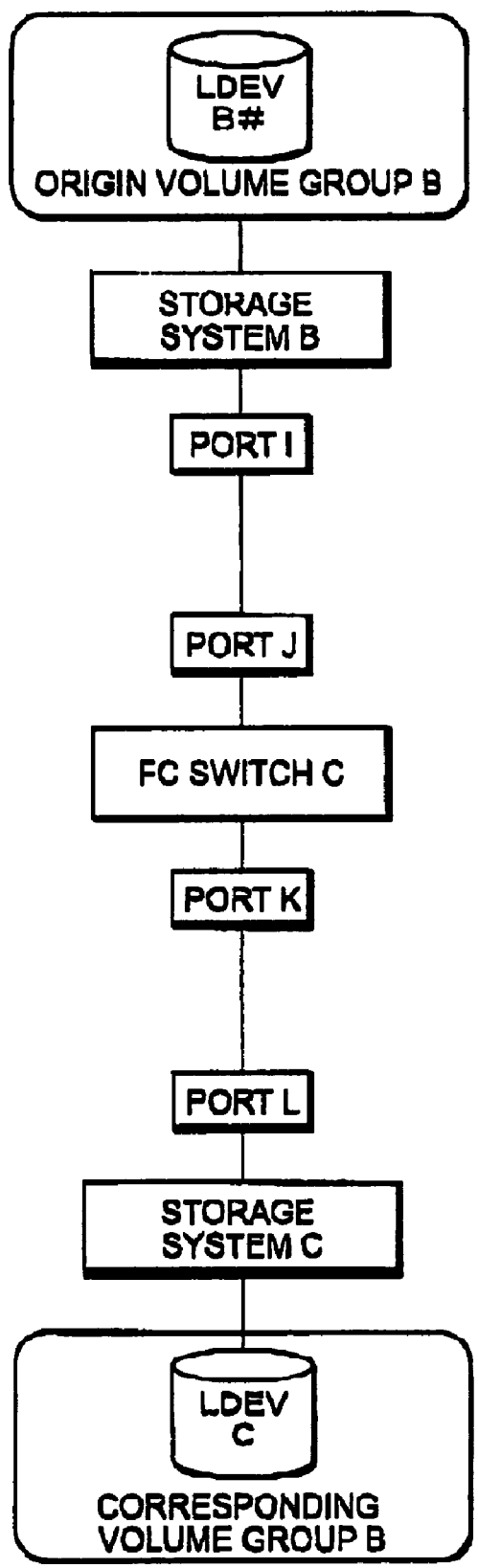
FIG. 21 is a display example of the external connection topology view.

If an operator designates "D: drive" of the host computer 60 in that FC-SAN environment and selects the end-to-end topology view, the topology view shown in FIG. 19 is displayed. Moreover, if the operator directs an instruction at the logical volume A# icon to select the end-to-end topology view for the external connection, the topology view of the external connection part between the storage systems 10 and 40 is displayed as shown in FIG. 20. Furthermore, if the operator directs an instruction at the logical volume B# icon to select the end-to-end topology view for the external connection, the topology view of the external connection part between the storage systems 40 and 50 is displayed as shown in FIG. 21.

With Embodiment 2, it is possible to display the network topology when the external storage systems are cascade-connected.

Embodiment 3

Embodiment 3 describes a network topology view display when a virtualization switch is used in place of the storage system having the external connecting function. Specific procedures to prepare the FC-SAN network topology view are similar to those described above and thereby omitted.

Figure 22:
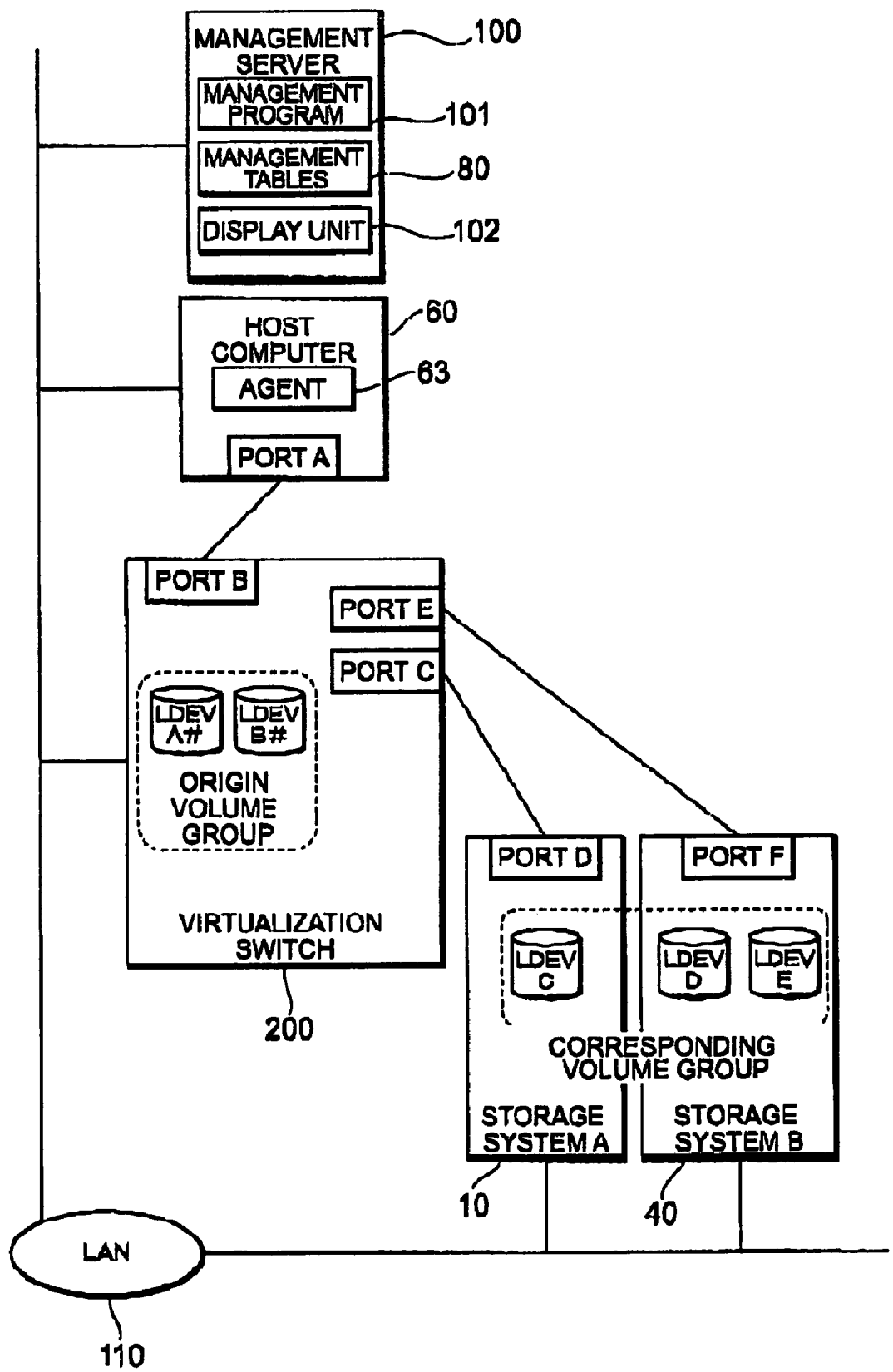
FIG. 22 is a network configuration diagram of a storage system according to Embodiment 3.

FIG. 22 shows the FC-SAN network configuration where a virtualization switch 200 is interposed between the host computer 60 and the storage systems 10 and 40. The virtualization switch 200 has the function of providing the host computer 60 with storage resources of the external connection storage systems 10 and 40, and the virtualization switch 200 itself can serve as SCSI targets. A corresponding volume group consisting of the logical volumes C, D, and E that belong to the storage systems 10 and 40 is mapped to an origin volume group consisting of the logical volumes A# and B# that belong to the virtualization switch 200. The virtualization switch 200 converts I/O from the host computer 60 to logical volumes A# and B#, into I/O to logical volumes C, D, and E.

Specifically speaking, the storage system 10 implements LUN masking of logical volume C from port D to port C, and an access path is defined for the virtualization switch 200 to have access from port C via port D to logical volume C. Also, the storage system 40 implements LUN masking of logical volumes D and E from port F to port E, and an access path is declined for the virtualization switch 200 to have access from port E via port F to logical volumes D and E.

Figure 23:
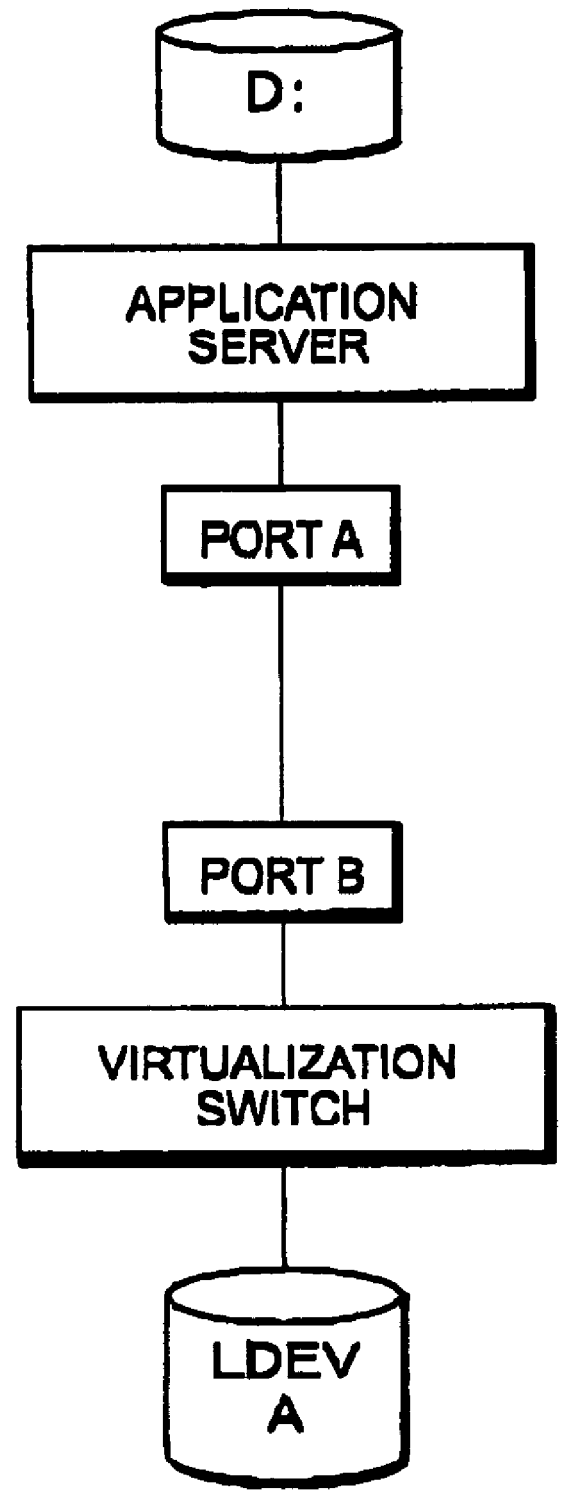
FIG. 23 is a display example of the host volume topology view.
Figure 24:
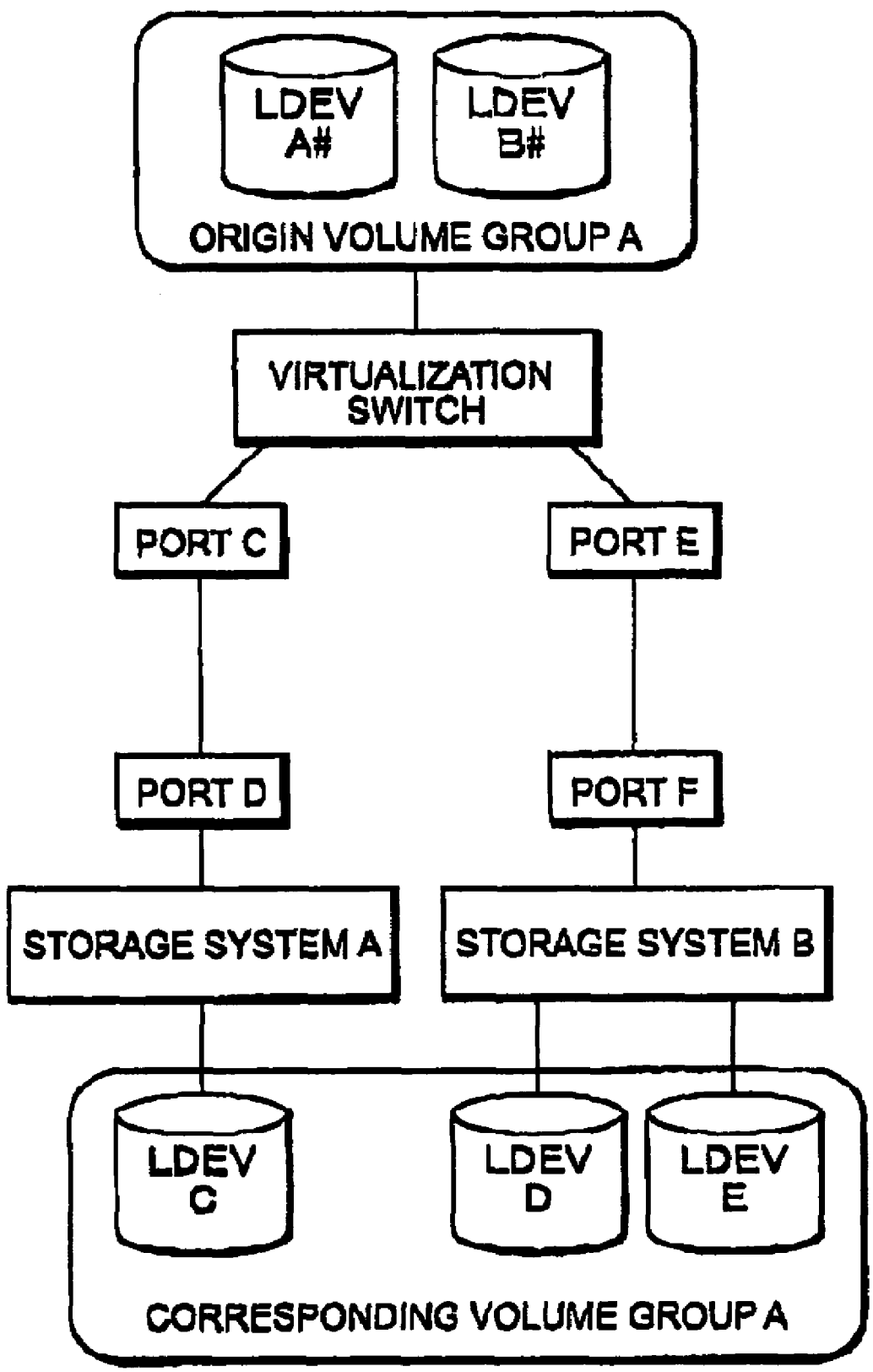
FIG. 24 is a display example of the external connection topology view.

If an operator designates "D: drive" of the host computer 60 in that FC-SAN environment and selects the and-to-end topology view, the topology view shown in FIG. 23 is displayed. Moreover, if the operator directs an instruction at the logical volume A# icon to select the end-to-end topology view for the external connection, the topology view of the external connection part between the virtualization switch 200 and storage systems A and B is displayed as shown in FIG. 24.

With Embodiment 3, it is possible to display the FC-SAN network topology when the virtualization switch 200 is interposed between the host computer 60 and the storage systems 10 and 40.

What is claimed is:

1. A method for displaying a network topology of a storage network including a storage controller having a virtual volume, and an external storage system having an external volume, wherein the external volume is mapped to the virtual volume, the network topology displaying method comprising the steps of:

collecting port connection information about an access path defined between the virtual volume and the external volume;

collecting a first network address for identifying an access port of the storage controller on the access path;

collecting a second network address for identifying an access port of the external storage system on the access path;

collecting identification information for identifying the external volume; and displaying the network topology between the virtual volume and the external volume, based on the port connection information, the first network address, the second network address, and the identification information, wherein said displaying step comprises:

preparing a new view to display the network topology, searching in an origin volume group management table for an entry having a Logical Device (LDEV) number that coincides with a LDEV number of a designated logical volume, displaying an origin volume group name and volume group icon of an origin volume group of the designated logical volume, referring to the entry of the origin volume group management table and displaying LDEV numbers belonging to the origin volume group and their volume icons, displaying a node name and a node icon of the storage system and connecting the node icon of the storage system with a volume group icon of the origin volume group, searching for an entry of a corresponding volume group management table that has a corresponding volume group number in the origin volume group management table, searching the entry of the corresponding volume group management table for the corresponding volumes whose origin World Wide Name (WWN), opponent WWN, and Logical Unit Number (LUN) coincide with the WWN of an access port of the external storage system, and the WWN and the LUN of an access port and a volume of the external storage system, searching for an entry of a port management table corresponding to the origin WWN, displaying port name and port icon of the port having the origin WWN, and connecting the port icon of the port having the origin WWN with the node icon, searching for an access path from the origin WWN to the opponent WWN which is stored in the entry of the corresponding volume management table entry, selecting an access path from the searched access paths and skipping a part of the access paths that have already been used for drawing the network topology, selecting a next port to be connected to the port icon of the port having the origin WWN and connecting a port icon of the next port with an adjacent port icon, searching for an entry of the port management table that stores the port name of the selected port, searching node management table entries for the node name of the node to which the selected port belongs, displaying a node name and node icon of the node to which the selected port belongs, and connecting the node icon of the node to which the selected port belongs with the port icon, selecting a next port in the selected path, displaying the port name and port icon of the next port, and connecting the port icon of the next port with the node icon, determining whether the next port is a terminal port or not, wherein if the next port is not the terminal port, then repeating the skipping step, wherein if the next port is the terminal port, then determining if there is any other access path that has not been selected, and wherein if another access path exists, then repeating the selecting an access path step, if there is no other access path, then displaying port name and port icon of the terminal port and connecting the terminal port with its adjacent port icon, searching for an entry of the port management table that stores the port name of the terminal port, and the node number of the node to which the terminal port belongs, searching the entry of the node management table for the node name of the node corresponding to the node number, and displaying the node name and node icon of the node to which the terminal port belongs and connecting this node icon with the port icon, searching for an entry of the LDEV management table for the logical volume that has the opponent WWN, origin WWN, and LUN respectively coinciding with the origin WWN, opponent WWN, and LUN stored in the entry of the corresponding volume management table, displays the icon of the logical volume, and, if the logical volume is a virtual volume, then displaying volume name and connecting the icon of the logical volume icon with the node icon, checking if all corresponding volumes are displayed, wherein if there is any corresponding volume that is not displayed, repeat the searching for an entry of a LDEV management table for the logical volume step, and checking if there is any corresponding volume that has not been selected, wherein if there is any corresponding volume that has not been selected, then repeat the searching for an entry of a LDEV management table for the logical volume step, and if all procedures to display the corresponding volumes are completed, then displaying the corresponding volume group icon.

2. The network topology display method according to claim 1, wherein the storage network includes a plurality of external volumes that are cascade-connected, and the respective external volumes are mapped sequentially to their adjacent external volumes.

3. The network topology display method according to claim 1, wherein the storage controller is a virtualization switch.

4. The network topology display method according to claim 1, further comprising the step of displaying the network topology in response to an operator's instructions directed at an icon representing the virtual volume.

5. A management server for displaying a network topology or a storage network including a storage controller having a virtual volume, and an external storage system having an external volume, wherein the external volume is mapped to the virtual volume, the management server comprising:

a management table for storing port connection information about an access path defined between the virtual volume and the external volume, a first network address for identifying an access port of the storage controller on the access path, a second network address for identifying an access port of the external storage system on the access paths and identification information for identifying the external volume; and a display unit for displaying the network topology of the storage network, based on the first network address, the second network address, and the identification information stored in the management table, wherein said displaying process preformed by the displaying unit comprises:

preparing a new view to display the network topology, searching in an origin volume group management table for an entry having a Logical Device (LDEV) number that coincides with a LDEV number of a designated logical volume, displaying an origin volume group name and volume group icon of an origin volume group of the designated logical volume, referring to the entry of the origin volume group management table and displaying LDEV numbers belonging to the origin volume group and their volume icons, displaying a node name and a node icon of the storage system and connecting the node icon of the storage system with a volume group icon of the origin volume group, searching for an entry of a corresponding volume group management table that has a corresponding volume group number in the origin volume group management table, searching the entry of the corresponding volume group management table for the corresponding volumes whose origin World Wide Name (WWN), opponent WWN, and Logical Unit Number (LUN) coincide with the WWN of an access port of the external storage system, and the WWN and the LUN of an access port and a volume of the external storage system, searching for an entry of a port management table corresponding to the origin WWN, displaying port name and port icon of the port having the origin WWN, and connecting the port icon of the port having the origin WWN with the node icon, searching for an access path from the origin WWN to the opponent WWN which is stored in the entry of the corresponding volume management table entry, selecting an access path from the searched access paths and skipping a part of the access paths that have already been used for drawing the network topology, selecting a next port to be connected to the port icon of the port having the origin WWN and connecting a port icon of the next port with an adjacent port icon, searching for an entry of the port management table that stores the port name of the selected port, searching node management table entries for the node name of the node to which the selected port belongs, displaying a node name and node icon of the node to which the selected port belongs, and connecting the node icon of the node to which the selected port belongs with the port icon, selecting a next port in the selected path, displaying the port name and port icon of the next port, and connecting the port icon of the next port with the node icon, determining whether the next port is a terminal port or not, wherein if the next port is not the terminal port, then repeating the skipping step, wherein if the next port is the terminal port, then determining if there is any other access path that has not been selected, and wherein if another access path exists, then repeating the selecting an access path step, if there is no other access path, then displaying port name and port icon of the terminal port and connecting the terminal port with its adjacent port icon, searching for an entry of the port management table that stores the port name of the terminal port, and the node number of the node to which the terminal port belongs, searching the entry of the node management table for the node name of the node corresponding to the node number, and displaying the node name and node icon of the node to which the terminal port belongs and connecting this node icon with the port icon, searching for an entry of the LDEV management table for the logical volume that has the opponent WWN, origin WWN, and LUN respectively coinciding with the origin WWN, opponent WWN, and LUN stored in the entry of the corresponding volume management table, displays the icon of the logical volume, and, if the logical volume is a virtual volume, then displaying volume name and connecting the icon of the logical volume icon with the node icon, checking if all corresponding volumes are displayed, wherein if there is any corresponding volume that is not displayed, repeat the searching for an entry of a LDEV management table for the logical volume step, and checking if there is any corresponding volume that has not been selected, wherein if there is any corresponding volume that has not been selected, then repeat the searching for an entry of a LDEV management table for the logical volume step, and if all procedures to display the corresponding volumes are completed, then displaying the corresponding volume group icon.

6. The management server according to claim 5, wherein the storage network includes a plurality of external volumes that are cascade-connected, and the respective external volumes are mapped sequentially to their adjacent external volumes.

7. The management server according to claim 5, wherein the storage controller is a virtualization switch.

8. The management server according to claim 5, wherein the management server displays the network topology in response to an operator's instructions directed at an icon representing the virtual volume.

9. A computer program product comprising a storage medium storing a network management program for causing a computer system to execute processing to display a network topology of a storage network including a storage controller having a virtual volume, and an external storage system having an external volume mapped to the virtual volume, wherein the network management program causes the computer system to execute the steps of:

collecting port connection information about an access path defined between the virtual volume and the external volume;

collecting a first network address for identifying an access port of the storage controller on the access path;

collecting a second network address for identifying an access port of the external storage system on the access path;

collecting identification information for identifying the external volume; and displaying the network topology between the virtual volume and the external volume, based on the port connection information, the first network address, the second network address, and the identification information wherein said displaying step comprises:

preparing a new view to display the network topology, searching in an origin volume group management table for an entry having a Logical Device (LDEV) number that coincides with a LDEV number of a designated logical volume, displaying an origin volume group name and volume group icon of an origin volume group of the designated logical volume, referring to the entry of the origin volume group management table and displaying LDEV numbers belonging to the origin volume group and their volume icons, displaying a node name and a node icon of the storage system and connecting the node icon of the storage system with a volume group icon of the origin volume group, searching for an entry of a corresponding volume group management table that has a corresponding volume group number in the origin volume group management table, searching the entry of the corresponding volume group management table for the corresponding volumes whose origin World Wide Name (WWN), opponent WWN, and Logical Unit Number (LUN) coincide with the WWN of an access port of the external storage system, and the WWN and the LUN of an access port and a volume of the external storage system, searching for an entry of a port management table corresponding to the origin WWN, displaying port name and port icon of the port having the origin WWN, and connecting the port icon of the port having the origin WWN with the node icon, searching for an access path from the origin WWN to the opponent WWN which is stored in the entry of the corresponding volume management table entry, selecting an access path from the searched access paths and skipping a part of the access paths that have already been used for drawing the network topology, selecting a next port to be connected to the port icon of the port having the origin WWN and connecting a port icon of the next port with an adjacent port icon, searching for an entry of the port management table that stores the port name of the selected port, searching node management table entries for the node name of the node to which the selected port belongs, displaying a node name and node icon of the node to which the selected port belongs, and connecting the node icon of the node to which the selected port belongs with the port icon, selecting a next port in the selected path, displaying the port name and port icon of the next port, and connecting the port icon of the next port with the node icon, determining whether the next port is a terminal port or not, wherein if the next port is not the terminal port, then repeating the skipping step, wherein if the next port is the terminal port, then determining if there is any other access path that has not been selected, and wherein if another access path exists, then repeating the selecting an access path step, if there is no other access path, then displaying port name and port icon of the terminal port and connecting the terminal port with its adjacent port icon, searching for an entry of the port management table that stores the port name of the terminal port, and the node number of the node to which the terminal port belongs, searching the entry of the node management table for the node name of the node corresponding to the node number, and displaying the node name and node icon of the node to which the terminal port belongs and connecting this node icon with the port icon, searching for an entry of the LDEV management table for the logical volume that has the opponent WWN, origin WWN, and LUN respectively coinciding with the origin WWN, opponent WWN, and LUN stored in the entry of the corresponding volume management table, displays the icon of the logical volume, and, if the logical volume is a virtual volume, then displaying volume name and connecting the icon of the logical volume icon with the node icon, checking if all corresponding volumes are displayed, wherein if there is any corresponding volume that is not displayed, repeat the searching for an entry of a LDEV management table for the logical volume step, and checking if there is any corresponding volume that has not been selected, wherein if there is any corresponding volume that has not been selected, then repeat the searching for an entry of a LDEV management table for the logical volume step, and if all procedures to display the corresponding volumes are completed, then displaying the corresponding volume group icon.

10. The computer program product according to claim 9, wherein the storage network includes a plurality of external volumes that are cascade-connected, and the respective external volumes are mapped sequentially to their adjacent external volumes.

11. The computer program product according to claim 9, wherein the storage controller is a virtualization switch.

12. The computer program product according to claim 9, wherein the network management program further causes the computer system to execute the step of displaying the network topology in response to an operator's instructions directed at an icon representing the virtual volume.

* * * * *